(12) United States Patent
Harada et al.

(10) Patent No.: US 8,875,020 B2
(45) Date of Patent: Oct. 28, 2014

(54) PORTABLE INFORMATION PROCESSING APPARATUS AND CONTENT REPLAYING METHOD

(75) Inventors: Noriyuki Harada, Kawasaki (JP); Hiroshi Kanno, Kawasaki (JP); Eiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 996 days.

(21) Appl. No.: 12/773,403

(22) Filed: May 4, 2010

(65) Prior Publication Data

US 2010/0293464 A1   Nov. 18, 2010

(30) Foreign Application Priority Data

May 15, 2009   (JP) .................................. 2009-119303
Sep. 10, 2009   (JP) .................................. 2009-209748

(51) Int. Cl.
| | | |
|---|---|---|
| *G06F 3/00* | (2006.01) | |
| *G10H 1/36* | (2006.01) | |
| *G11B 27/10* | (2006.01) | |
| *G06F 3/0488* | (2013.01) | |
| *G11B 27/34* | (2006.01) | |
| *G06F 3/0485* | (2013.01) | |
| *G11B 27/11* | (2006.01) | |
| *H04M 1/725* | (2006.01) | |

(52) U.S. Cl.
CPC ................ *G11B 27/10* (2013.01); *G10H 1/361* (2013.01); *H04M 1/72558* (2013.01); *G06F 3/04883* (2013.01); *G10H 2230/015* (2013.01); *G10H 2240/325* (2013.01); *G10H 2220/011* (2013.01); *G11B 27/34* (2013.01); *G06F 3/0485* (2013.01); *G11B 27/11* (2013.01)
USPC ...................................................... 715/716

(58) Field of Classification Search
CPC ....................................................... G06F 3/00
USPC ............................................................ 715/716
See application file for complete search history.

(56) References Cited

U.S. PATENT DOCUMENTS 5,194,683 A * 3/1993 Tsumura et al. .......... 434/307 A
5,705,762 A * 1/1998 Kang et al. ...................... 84/610
(Continued)

FOREIGN PATENT DOCUMENTS

EP   0701243 A1   3/1996
EP   1640989 A2   3/2006
(Continued)

OTHER PUBLICATIONS

European Search Report dated Jul. 28, 2010, issued in corresponding European Patent Application No. 10162525.

(Continued)

*Primary Examiner* — Matthew Ell
(74) *Attorney, Agent, or Firm* — Westerman, Hattori, Daniels & Adrian, LLP

(57) ABSTRACT

A portable information processing apparatus includes a replay processing unit that replays content data, a synchronous display unit that selects a piece of associated information corresponding to a replayed portion of the content data, and instructs to display the associated information thus selected, and an output controlling unit that displays the associated information that is selected by the synchronous display unit in an associated information display area arranged in a display unit. The synchronous display unit selects the associated information other than the one corresponding to the replayed portion and instructs the output controlling unit to display the information, upon accepting an operation requesting to display associated information other than the one corresponding to the replayed portion.

13 Claims, 29 Drawing Sheets

(56) References Cited

U.S. PATENT DOCUMENTS

| | | | |
|---|---|---|---|
| 6,053,740 A | | 4/2000 | Nakata et al. |
| 6,976,229 B1 * | | 12/2005 | Balabanovic et al. ........ 715/838 |
| 7,058,889 B2 * | | 6/2006 | Trovato et al. ................ 715/716 |
| 8,332,774 B2 | | 12/2012 | Kawashima |
| 2004/0152054 A1 | | 8/2004 | Gleissner et al. |
| 2004/0266337 A1 | | 12/2004 | Radcliffe et al. |
| 2006/0265637 A1 | | 11/2006 | Marriott et al. |
| 2008/0263448 A1 | | 10/2008 | Oppenheimer |
| 2009/0219247 A1 | | 9/2009 | Watanabe et al. |

FOREIGN PATENT DOCUMENTS

| | | | |
|---|---|---|---|
| EP | 1956601 A2 | 8/2008 | |
| JP | 10-198389 A | 7/1998 | |
| JP | 11-095777 A | 4/1999 | |
| JP | 2000-099044 A | 4/2000 | |
| JP | 2002-006865 A | 1/2002 | |
| JP | 2002-215174 A | 7/2002 | |
| JP | 2003-108279 A | 4/2003 | |
| JP | 2005-309001 A | 11/2005 | |
| JP | 2006-163085 A | 6/2006 | |
| JP | 2006-235268 A | 9/2006 | |
| JP | 2009-129285 A | 6/2009 | |
| JP | 2009-205565 A | 9/2009 | |

OTHER PUBLICATIONS

"EvilLyrics FAQ" Internet Citation 2005, pp. 1-33, XP002529750; Retrieved from the internet: URL:http://www.evillabs.sk/evillyrics/faq/faq.php.

Apple "i Pod classic Features Guide" Internet Citation Jan. 14, 2008, pp. 72pp, XP007905216; Retrieved from the Internet : URL: http://manuals.info.apple.com/en_US/ipod_classic_Features_Guide.pdf.

Office Action dated Jul. 30, 2013, issued in corresponding Japanese application No. 2009-209748, with English Translation.

* cited by examiner

FIG.19

```
<00:00:00> ♪♪C G7 C♪♪
<00:05:50> ♪♪C G7 C♪♪
<00:07:40> ♪♪C G7 C♪♪
<00:10:60> ♪♪C♪♪DE N DE N MU SHI MU SHI KA TA TSU MU  ♪♪Dm7♪♪ RI
<00:18:70> ♪♪C♪♪O MA E NO  A TA MA HA
<00:22:80> ♪♪G♪♪DO KO NI A  ♪♪Dm7♪♪ RU
<00:24:90> ♪♪C♪♪TSU NO DA SE  YA RI DA SE  A TA MA DA SE
```

PORTABLE INFORMATION PROCESSING APPARATUS AND CONTENT REPLAYING METHOD

CROSS-REFERENCE TO RELATED APPLICATION

This application is based upon and claims the benefit of priority of the prior Japanese Patent Application No. 2009-119303, filed on May 15, 2009 and Japanese Patent Application No. 2009-209748, filed on Sep. 10, 2009, the entire contents of which are incorporated herein by reference.

FIELD

The embodiments discussed herein are directed to a portable information processing apparatus, a content replaying method, and a content replaying program.

BACKGROUND

Conventionally, content data such as music and moving image has been utilized through replay. The content data is replayed on an information processing apparatus such as a mobile telephone or a computer. In addition, if the content data is a song, for example, lyrics may be displayed as character information (text).

Especially in a service such as karaoke which is designed to assist user's singing activities, karaoke content data is prepared by combining a data piece corresponding to music and a data piece corresponding to lyric, and used in the service to display the lyrics in synchronization with the progress of the song.

Furthermore, some discussions have been made to realize karaoke-like services by replaying the music data and the text data in synchronization. Because a service for distributing music data for listening has already been popularized, a user can separately prepare lyric text data that correspond to the music data.

If the text data such as lyrics is to be displayed in synchronization with replay of content data such as a song, a part of the text data matching the replayed portion of the content data needs to be displayed.

In addition, in some cases, texts other than the one corresponding to the replayed portion may need to be displayed. An example of such a situation is that, while a portion of the lyric is displayed correspondingly to the replay of the music data, a user may wish to see a portion of the lyrics that is coming next, or to check a portion of the lyric that corresponds to a music portion which has already replayed.

One conventional solution to the above is to provide a separate area from an area displaying the text corresponding to the replayed portion, so that an arbitrary portion of the entire text data can be displayed in the separate area (see, for example, Japanese Laid-open Patent Publication No. 2006-163085).

However, the size of the display of a portable information processing apparatus such as a mobile telephone, a personal digital assistant (PDA), or a portable music player is limited because of the small-size housing of the apparatus itself. Hence, only a limited amount of information can be displayed thereon.

Therefore, it is difficult to provide a plurality of areas for displaying associated information such as lyrics as is suggested in the conventional technology. In some cases, an image, such as a video, other than the associated information cannot be displayed properly.

Furthermore, when there is an area for displaying an arbitrary portion of entire associated data, i.e., data including associated information, separately from an area for displaying associated information corresponding to the replayed portion, user operations would become cumbersome. In addition, correspondence between the contents displayed on the area for displaying the arbitrary portion of the entire associated data and the replayed portion is not indicated. Therefore, the user may confound the contents displayed in one display area with the contents of another display area, and may make incorrect operations. Furthermore, because a plurality of display areas are to be controlled individually, the control becomes complex.

Furthermore, if the size of the display is increased, so that the display areas for the associated information can be provided, the entire housing would be enlarged. Then, the apparatus becomes unsuitable as a portable device. In addition, costs may be increased due to increased price of the display itself.

SUMMARY

According to an aspect of an embodiment of the invention, a portable information processing apparatus includes: a replay processing unit that replays content data; a synchronous display unit that selects a piece of associated information corresponding to a replayed portion of the content data, from a plurality of pieces of associated information contained in associated data corresponding to the replayed content data, and instructs to display the associated information thus selected; and an output controlling unit that displays the associated information that is selected by the synchronous display unit in an associated information display area arranged in a display unit, wherein upon accepting an operation requesting to display associated information other than the one corresponding to the replayed portion of the content data, out of the pieces of the associated information contained in the associated data corresponding to the replayed content data, the synchronous display unit selects the associated information other than the one corresponding to the replayed portion based on the operation and instructs the output controlling unit to display the information.

According to another aspect of an embodiment of the invention, a method for replaying content data, the method includes: replaying the content data; selecting a piece of associated information corresponding to a replayed portion of the content data from a plurality of pieces of associated information contained in associated data corresponding to the content data, and instructs to display the associated information thus selected; controlling output to display the associated information selected at the selecting in an associated information display area arranged on a display unit; accepting an operation requesting to display associated information other than the one corresponding to the replayed portion of the content data out of the pieces of the associated information contained in the associated data corresponding to the content data; and selecting the associated information other than the one corresponding to the replayed portion based on the operation and instructing the output controlling unit to display the information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 19 is a schematic of an example of lyrics data;

DESCRIPTION OF EMBODIMENT(S)

Preferred embodiments of the present invention will be explained with reference to accompanying drawings. However, the embodiments disclosed herein are not intended to limit the scope of the invention in any way.

[a] First Embodiment

Figure 1:
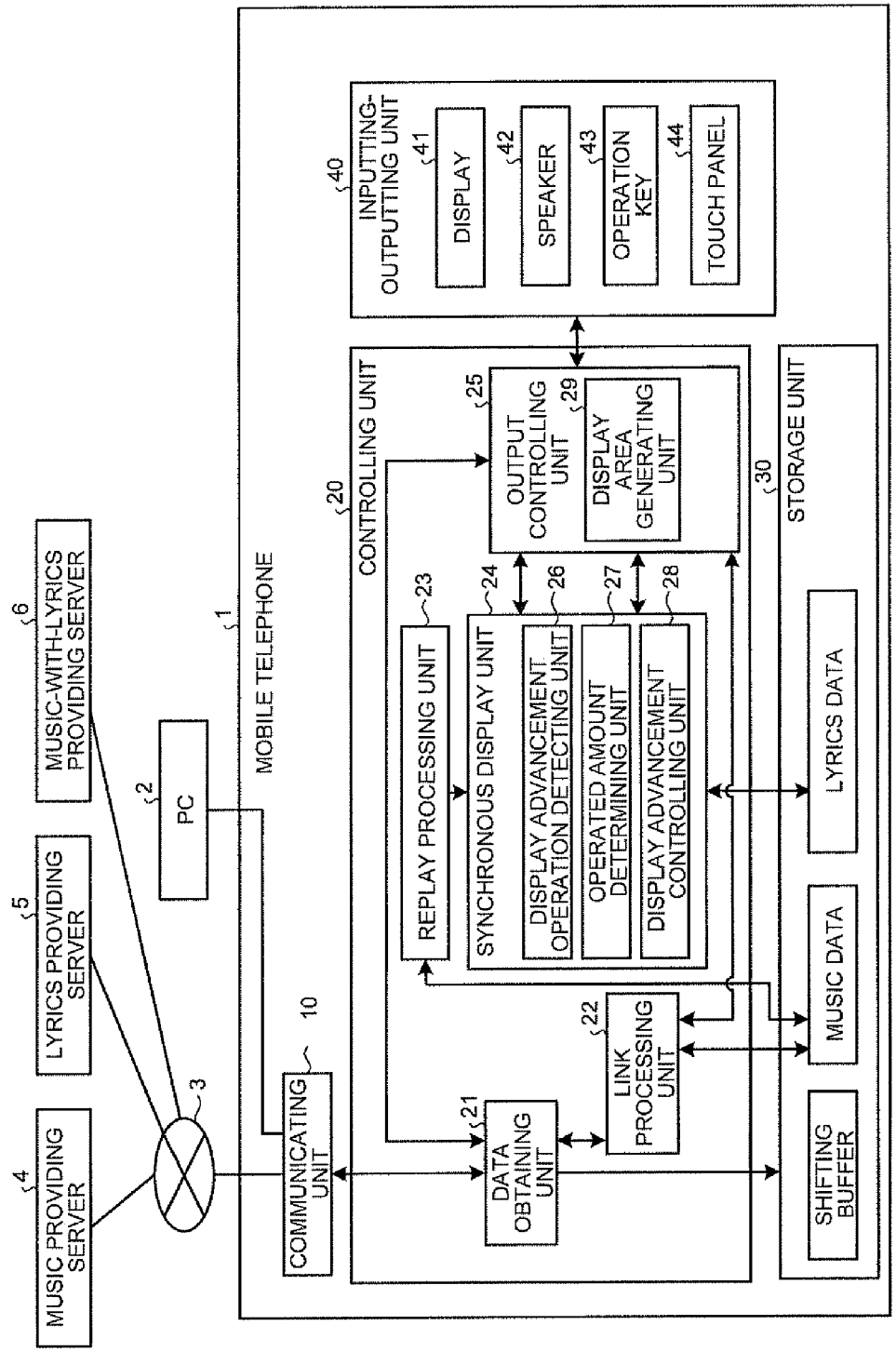
FIG. 1 is a schematic of a configuration of a mobile telephone according to a first embodiment of the present invention.

FIG. 1 is a schematic of a configuration of a mobile telephone that is a portable information processing apparatus according to a first embodiment of the present invention. A mobile telephone 1 illustrated in FIG. 1 includes a communicating unit 10, a controlling unit 20, a storage unit 30, and an inputting-outputting unit 40.

The communicating unit 10 communicates with an external apparatus to obtain content data such as music data and text data such as lyrics data. The embodiment is explained hereinafter using an exemplary configuration in which the lyrics are sequentially displayed in synchronization with replay of a piece of music, using music data as the content data, and lyrics data as the text data. The text data is an example of associated data.

The communicating unit 10 is connected to a music providing server 4, a lyrics providing server 5, and a music-with-lyrics providing server 6 over a network 3. The network 3 is, for example, the Internet. The mobile telephone 1 may connect to the network 3 over a wireless local area network (LAN), or a mobile telephone network provided by a mobile telephone service provider. The communicating unit 10 is connected to a personal computer (PC) 2. The mobile telephone 1 and the PC 2 may be connected over any connection schemes, such as the Universal Serial Bus (USB) or the Bluetooth.

The music providing server 4, the lyrics providing server 5, and the music-with-lyrics providing server 6 are, for example, a HyperText Transfer Protocol (HTTP) server or a File Transfer Protocol (FTP) server. The music providing server 4 provides music data to the mobile telephone 1 over the network 3. The lyrics providing server 5 provides the lyrics data to the mobile telephone 1 over the network 3. The music-with-lyrics providing server 6 provides the lyrics data corresponding to the music data to the mobile telephone 1 over the network 3.

The PC 2 provides the music data or the lyrics data to the mobile telephone 1. The music data or the lyrics data provided by the PC 2 is obtained from a storage medium such as a compact disc (CD), obtained over a network, or created by a user him/herself.

The storage unit 30 stores therein the music data and the lyrics data. Generally, a mobile telephone has a storage medium that a user can use for storing therein any data, such as image or telephone number data. In FIG. 1, the storage unit 30 that a user can store therein any data stores music data and lyrics data. A depiction of and an explanation about other data stored in the storage unit 30 are omitted herein. The storage unit 30 may also store therein a shifting buffer to allow the lyrics to be displayed before the song begins. The shifting buffer stores therein a default value, or a value specified by a user.

The inputting-outputting unit 40 is a user interface including a display 41, a speaker 42, an operation key 43, a touch panel 44, and the like.

The controlling unit 20 is a controller that controls the operation performed by the mobile telephone 1. The controlling unit 20 has, as a function of a general mobile telephone, a function to connect to a mobile telephone network provided by a mobile telephone service provider to establish a call. An explanation about the calling function is omitted herein, and processing units related to the content data and the text data handling will be explained.

The controlling unit 20 includes therein a data obtaining unit 21, a link processing unit 22, a replay processing unit 23, a synchronous display unit 24, and an output controlling unit 25.

The data obtaining unit 21 obtains the music data and the lyrics data located externally via the communicating unit 10, and stores the data in the storage unit 30. The link processing unit 22 establishes an association between the music data and the lyrics data.

The replay processing unit 23 reads the music data from the storage unit 30 and replays the music data. More specifically, the replay processing unit 23 decodes the coded music data, and sends the sound data to the output controlling unit 25. If an image or a video is included in the music data, the replay processing unit 23 sends the image or the video to the output controlling unit 25 as well. In addition, the replay processing unit 23 outputs information for identifying the music data to be replayed and the progress of the replay of the music to the synchronous display unit 24.

The synchronous display unit 24 is a processing unit that causes the lyrics data to be displayed in synchronization with the music data replayed by the replay processing unit 23. More specifically, the synchronous display unit 24 retrieves the lyrics data corresponding to the music data from the storage unit 30 based on the information for identifying the music data received from the replay processing unit 23. The synchronous display unit 24 then sequentially causes a plurality of lyrics phrases contained in the lyrics data to be displayed in synchronization with the progress of the music data replayed by the replay processing unit 23. More specifically, the display process performed by the synchronous display unit 24 is achieved by selecting a phrase of the lyrics to be displayed, and instructing the output controlling unit 25 to display the phrase.

The synchronous display unit 24 includes a display advancement operation detecting unit 26, an operated amount determining unit 27, and a display advancement controlling unit 28. The display advancement operation detecting unit 26 detects an operation requesting to display a lyrics phrase other than the one corresponding to the replayed portion of the music data, as a display advancement operation. A display advancement operation is entered using the operation key 43 or the touch panel 44. The operated amount determining unit 27 determines the operated amount of the display advancement operation. The operated amount of the display advancement operation will be explained later. Based on the display advancement operation, the display advancement controlling unit 28 selects a lyrics phrase other than the one corresponding to the replayed portion, and instructs the output controlling unit to display the lyrics phrase.

The output controlling unit 25 is a controller that controls a display output onto the display 41, and a sound output to the speaker 42. The output controlling unit 25 causes the speaker 42 to output the sound received from the replay processing unit 23. The output controlling unit 25 also combines the image or the video received from the replay processing unit 23 with the lyrics phrase received from the synchronous display unit 24 to generate a display screen that is to be displayed on the display 41. The output controlling unit 25 includes a display area generating unit 29. The operation performed by the display area generating unit 29 will be explained later.

The output controlling unit 25 also performs other functions of the mobile telephone 1, that is, resolves contentions between various outputs when the calling function, for example, generates a display or a sound output request; however, the explanation thereof is omitted herein.

Figure 2:
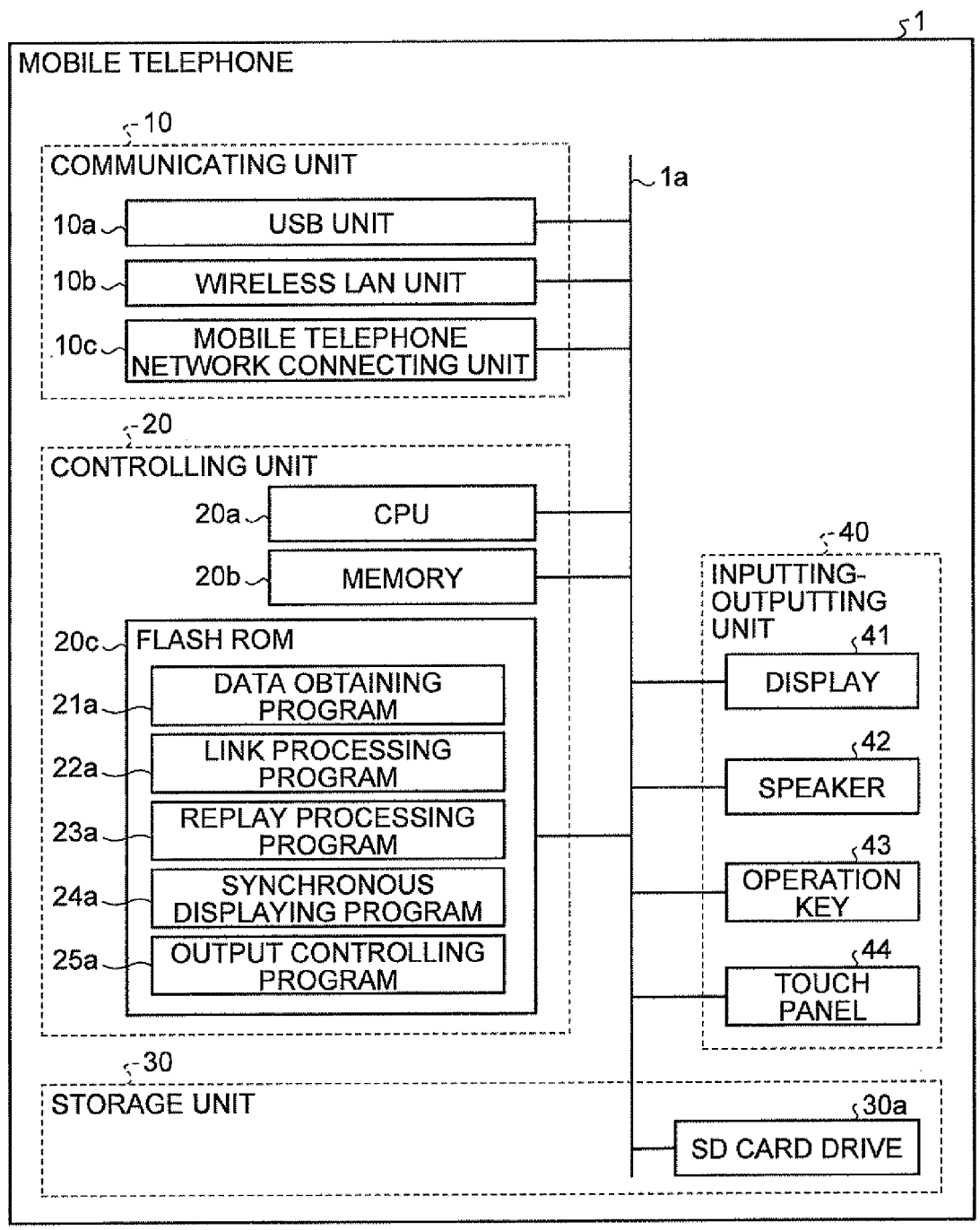
FIG. 2 is a schematic of a hardware configuration of a mobile telephone.

FIG. 2 is a schematic of a hardware configuration of the mobile telephone 1. In the mobile telephone 1, a USE unit 10a, a wireless LAN unit 10b, a mobile telephone network connecting unit 10c, a central processing unit (CPU) 20a, a memory 20b, a flash read-only memory (ROM) 20c, a secure digital (SD) card drive 30a, the display 41, the speaker 42, the operation key 43, and the touch panel 44 are connected to a bus 1a. The flash ROM is also referred to as a flash memory.

The USE unit 10a, the wireless LAN unit 10b, and the mobile telephone network connecting unit 10c implement the functions of the communicating unit 10. More specifically, the USB unit 10a is an interface for establishing a USE connection with the PC 2. The wireless LAN unit 10b is an interface for establishing a connection to the network 3 via a wireless LAN access point. The mobile telephone network connecting unit 10c is an interface for establishing a wireless connection to a mobile telephone network provided by a mobile telephone service provider.

The CPU 20a, the memory 20b, and the flash ROM 20c realize the functions of the controlling unit 20. More specifically, the CPU 20a reads various programs stored in the flash ROM 20c, expands the programs onto the memory 20b, and executes the programs sequentially to realize various functions of the controlling unit 20. The flash ROM 20c stores therein a data obtaining program 21a, a link processing program 22a, a replay processing program 23a, a synchronous displaying program 24a, and an output controlling program 25a.

The CPU 20a executes the data obtaining program 21a to realize the function of the data obtaining unit 21. The CPU 20a executes the link processing program 22a to realize the function of the link processing unit 22. The CPU 20a executes the replay processing program 23a to realize the function of the replay processing unit 23. The CPU 20a executes the synchronous displaying program 24a to realize the function of the synchronous display unit 24. The CPU 20a executes the output controlling program 25a to realize the function of the output controlling unit 25.

The areas in the flash ROM 20c that a user can use in any way, that is, the data storage, and the SD card drive 30a function as the storage unit 30. In the example described herein, an SD card is used as the storage unit 30; however, any storage medium can be used for implementing the storage unit 30.

Figure 3:
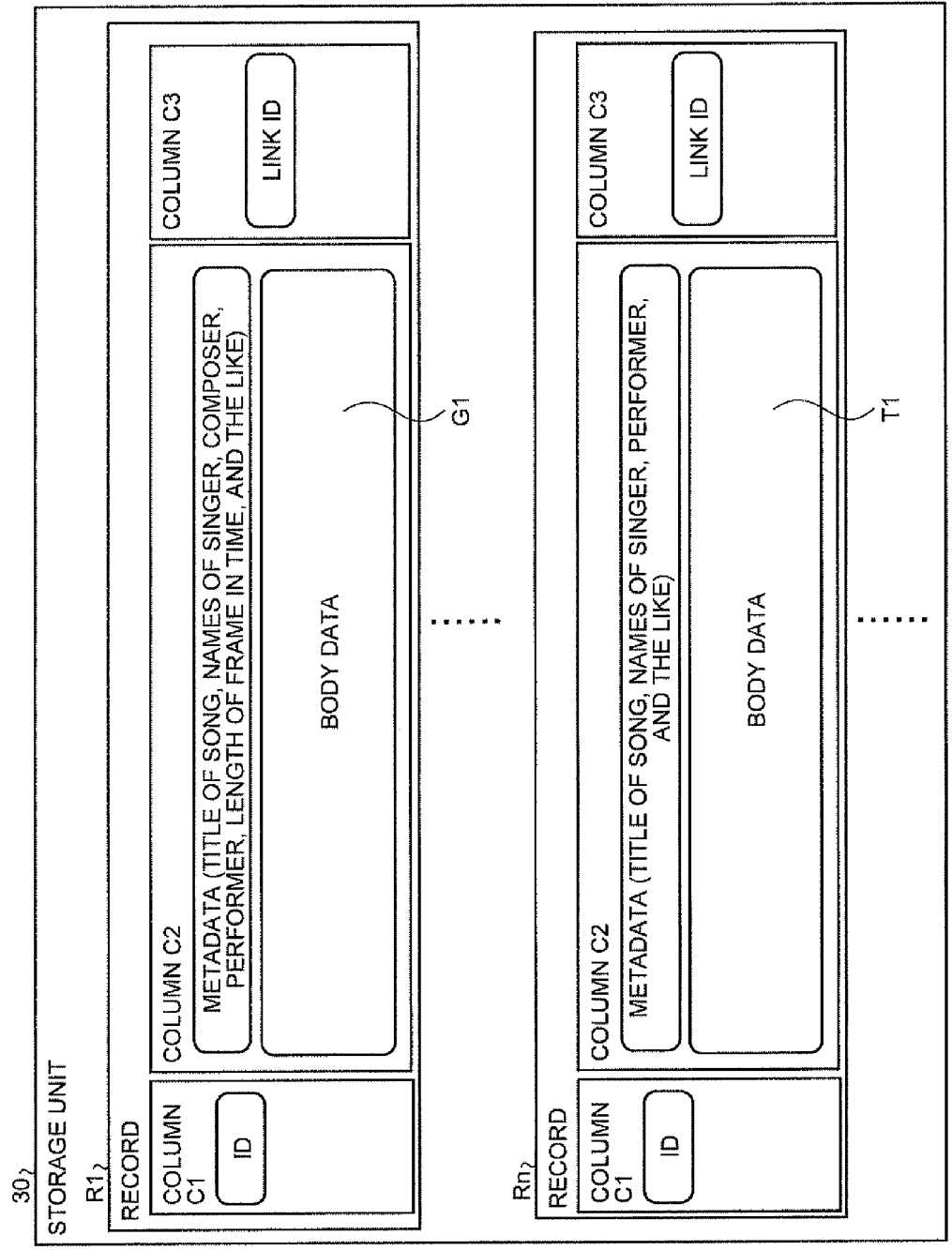
FIG. 3 is a schematic of music data and lyrics data.

FIG. 3 is a schematic for explaining the music data and the lyrics data. The music data and the lyrics data are stored in the storage unit 30 as records. Each of the records includes columns C1, C2, and C3. The column C1 stores therein identification information ID that uniquely identifies a record. The column C2 stores the music data and the lyrics data. The music data and the lyrics data each has body data that represents the music or the lyrics themselves, and metadata that is information relating to the music data or the lyrics data.

In FIG. 3, a record R1 represents the music data. Body data G1 in the music data includes a plurality of frames each of which is assigned with a replay order. The metadata in the music data contains information such as the title of a song, the names of a singer, a composer, a performer, or the length of a frame in time. The metadata in the music data may contain any other information such as a bit rate of the music, or a coding standard used therein.

In FIG. 3, a record Rn represents the lyrics data. Body data T1 in the lyrics data contains information representing lyrics phrases, and timing at which each of the phrases is displayed. The metadata in the lyrics data contains the title of a song, and the names of a singer and a performer. The lyrics data contains the information such as the name of the performer as well because, even if the title of a song and the like are the same, the timing at which each of the phrases is displayed may differ depending on the performer. By including the performer information in the metadata, and by establishing an association between the music data and the lyrics data using the performer information, the lyrics can be displayed at an appropriate timing with the music. In the same manner, if a phrase of the lyrics is to be displayed at a different timing depending on the length of the performance time for the same piece of music, performance time information may be included in the metadata. For the music data, an individual piece of music data should be entered for each of the different performer or the performance time or date. The lyrics metadata may also include any other information, such as the name of a lyricist.

The column C3 contains a link identification (ID) that is the information for establishing an association between the records. The link ID represents the identification of an associated record. To establish an association between the music data in the record R1 and the lyrics data in the record Rn, the identification of the record Rn is stored as the link ID in the column C3 of the record R1. In the same manner, the identification of the record R1 is stored as the link ID in the column C3 of the record Rn.

Figure 4:
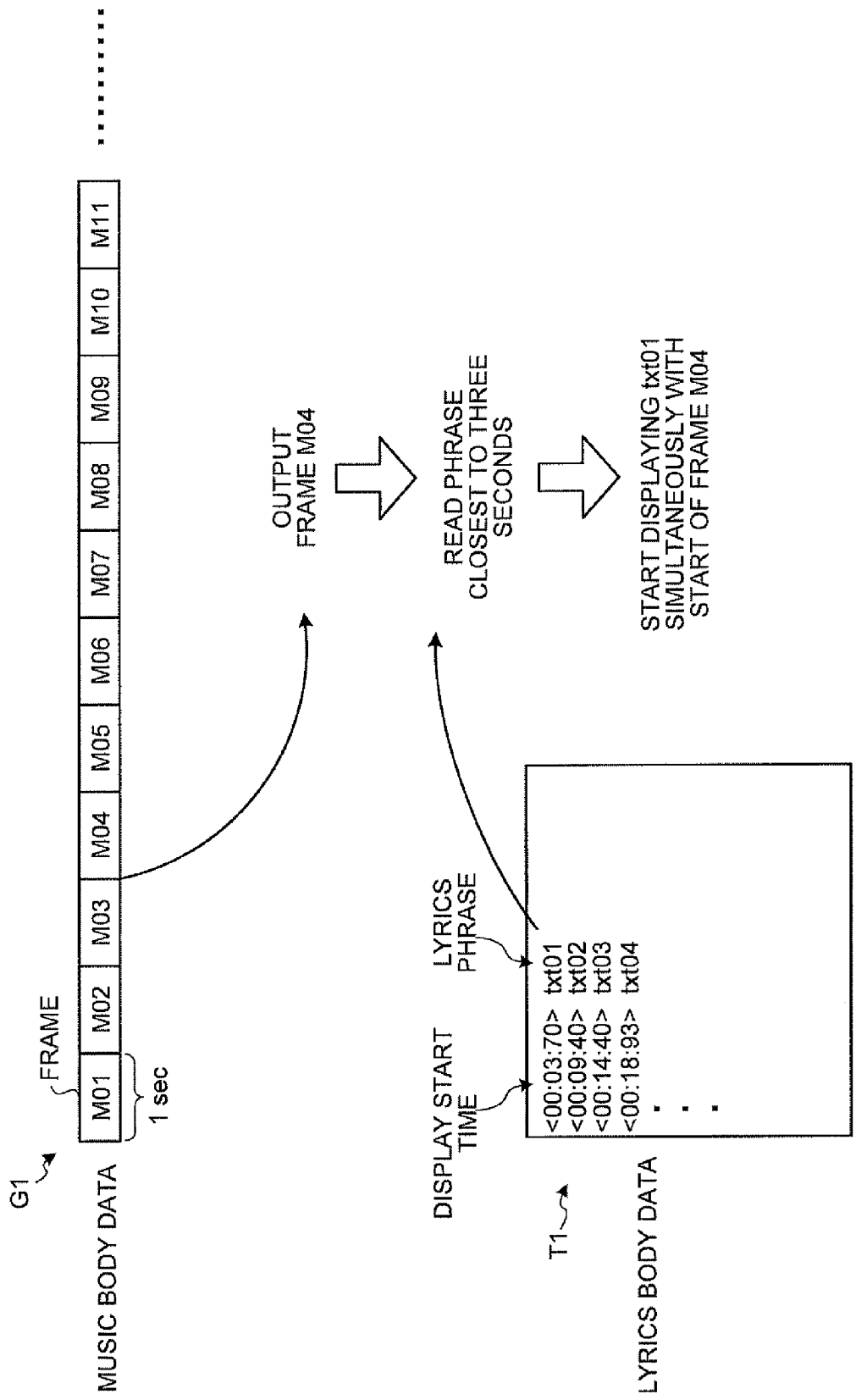
FIG. 4 is a schematic for explaining the display of the lyrics data in synchronization with the replay of the music data.

FIG. 4 is a schematic for explaining a synchronous display of the lyrics data with the replay of the music data. In the example illustrated in FIG. 4, the music body data G1 includes a plurality of frames, each having a length of one second. Each of these frames is also assigned with a replay order. In other words, each of the frames included in the music data is a piece of music segmented into the length of a second, and assigned with a frame number representing the order in which the frame is replayed. Upon starting replaying the music, a frame M01 is output. The output of the frame M01 is completed in one second. Subsequently, a frame M02, a frame M03, and following frames are sequentially output. The replay of the music is completed when the output of the last frame is completed.

In the example illustrated in FIG. 4, lyrics body data T1 includes a plurality of lyrics phrases and the display start time for each of the lyrics phrases. The display start time functions as information for indicating the timing at which each of the lyrics phrases is displayed. Each of the lyrics phrases is displayed for a period starting at the display start time of this lyrics phrase and ending at the display start time of the next lyrics phrase.

In the example illustrated in FIG. 4, a lyrics phrase txt01 starts to be displayed in three seconds after the music starts to be replayed. In nine seconds after the music starts to be replayed, the lyrics phrase txt01 is rewritten by a lyrics phrase txt02. In fourteen seconds after the music starts to be replayed, the lyrics phrase txt02 is rewritten by a lyrics phrase txt03. In eighteen seconds after the music starts to be replayed, the lyrics phrase txt03 is rewritten by a lyrics phrase txt04. The display of the lyrics phrases is finished in synchronization with the completion of the replay of the music. The content of a lyrics phrase can be kept blank to realize a period in which no lyrics are displayed. If a shifting buffer is set to allow the lyrics to be displayed before the song begins while the music is replayed, the lyrics are displayed at a timing shifted forward by the time set in the shifting buffer. More specifically, the timing at which the lyrics phrase is displayed is determined based on a value obtained by subtracting the time set in the shifting buffer from the display start time of the lyrics phrase. For example, if one second is set in the shifting buffer, in the example illustrated in FIG. 4, upon reading M04 in two seconds after the music starts to be replayed, a phrase having a display start time closest to two seconds and corresponds to the search range from the frame M04 to the frame M01, when one second is subtracted therefrom starts to be displayed. In other words, the lyrics phrase txt01 which starts to be displayed in 3.70-seconds starts to be displayed. Upon reading M10 in eight seconds after the music starts to be replayed, a phrase having a display start time closest to eight seconds and corresponds to the search range from the frame M10 to the frame M01 when one second is subtracted therefrom starts to be displayed. In other words, the lyrics phrase txt01 is rewritten by the lyrics phrase txt02 starting to be displayed after 9.40−1=8.40 seconds.

Upon starting the replay of a piece of music, the replay processing unit 23 notifies the identification information ID of the music to be replayed to the synchronous display unit 24. The replay processing unit 23 also notifies a frame output status to the synchronous display unit 24 from the beginning until the end of the replay.

The synchronous display unit 24 retrieves a record having the identification information ID notified by the replay processing unit 23 as a link ID. The replay processing unit 23 reads a record obtained as a result of the retrieval as lyrics data corresponding to the music data to be replayed. The synchronous display unit 24 then calculates the replay elapsed time based on the frame output status, and reads the lyrics phrases based on the calculated elapsed time.

For example, upon being notified that a frame M05 that is the fifth frame is to be output from the replay processing unit 23, the synchronous display unit 24 multiplies the frame number "5" by the frame length "one second", and determines that the frame M05 corresponds to the fifth second in the music. Thus, the synchronous display unit 24 reads the lyrics phrase having specified with a display start time and closest to the four seconds and corresponds to the search range from the frame M05 to the frame M01. In the example illustrated in FIG. 4, the lyrics phrase txt01 has the display start time of 3.7 seconds. Because the output start time of the frame M05 is four seconds, the synchronous display unit 24 starts displaying the lyrics phrase txt01 at the timing when the frame M05 is output. Therefore, the lyrics phrase txt01 starts to be displayed in four seconds after the music starts to be replayed.

Figure 5:
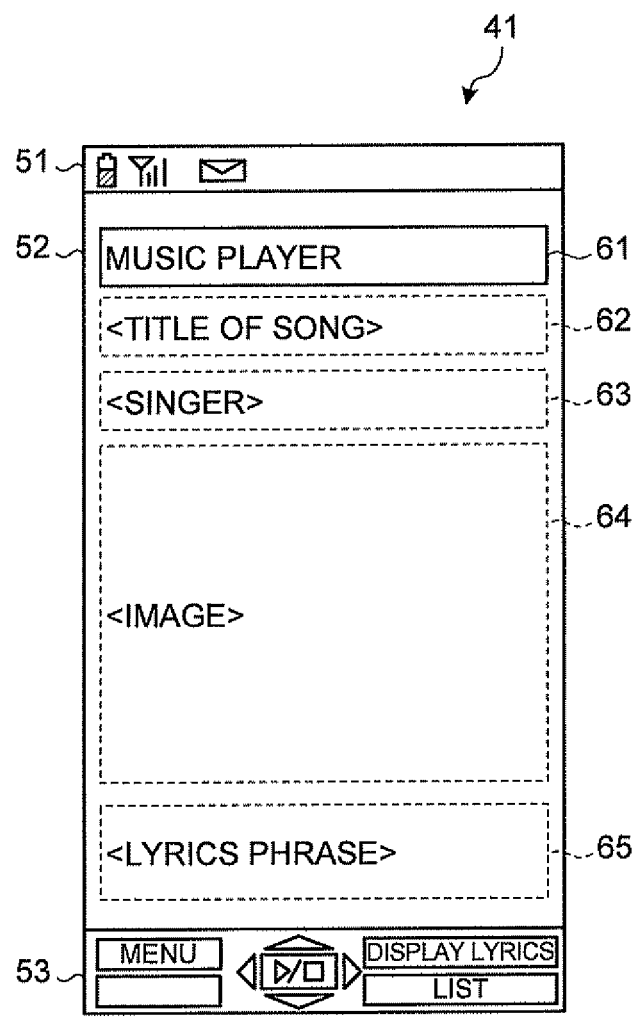
FIG. 5 is a schematic of a specific example of a screen displayed during the synchronous display of the lyrics.

FIG. 5 depicts a specific example of a screen displayed during the synchronous lyrics display. The output controlling unit 25 generates and displays such a display screen on the display 41. The display screen includes an apparatus status display area 51, a main display area 52, and an operation area 53. The display area generating unit 29 generates the apparatus status display area 51, the main display area 52, and the operation area 53.

The apparatus status display area 51 is an area for displaying the status of the mobile telephone 1. The status of the mobile telephone 1 includes, for example, a battery charging status, or a signal reception status. The operation area 53 is an area for assisting user operations by displaying operations to be executed when the operation key 43 are operated.

The output controlling unit 25 displays various information in the main display area 52 while the music data is being replayed. More specifically, the output controlling unit 25 generates a function name displaying area 61, a song title displaying area 62, a singer displaying area 63, an image displaying area 64, and a lyrics phrase displaying area 65 in the main display area 52. The display area generating unit 29 generates the function name displaying area 61, the song title displaying area 62, the singer displaying area 63, the image displaying area 64, and the lyrics phrase displaying area 65.

The output controlling unit 25 displays that a music replay function is being executed in the function name displaying area 61. The output controlling unit 25 displays the information about the title of the song, obtained from the metadata contained in the music data, in the song title displaying area 62. The output controlling unit 25 displays the information about the singer, obtained from the metadata contained in the music data, in the singer displaying area 63. The output controlling unit 25 displays the image contained in the music data in the image displaying area 64. Examples of the images contained in the music data include videos or photos on a liner. The output controlling unit 25 displays the lyrics phrase specified by the synchronous display unit 24 in the lyrics phrase displaying area 65. In other words, the lyrics phrase displaying area 65 functions as a text displaying area.

Figure 6:
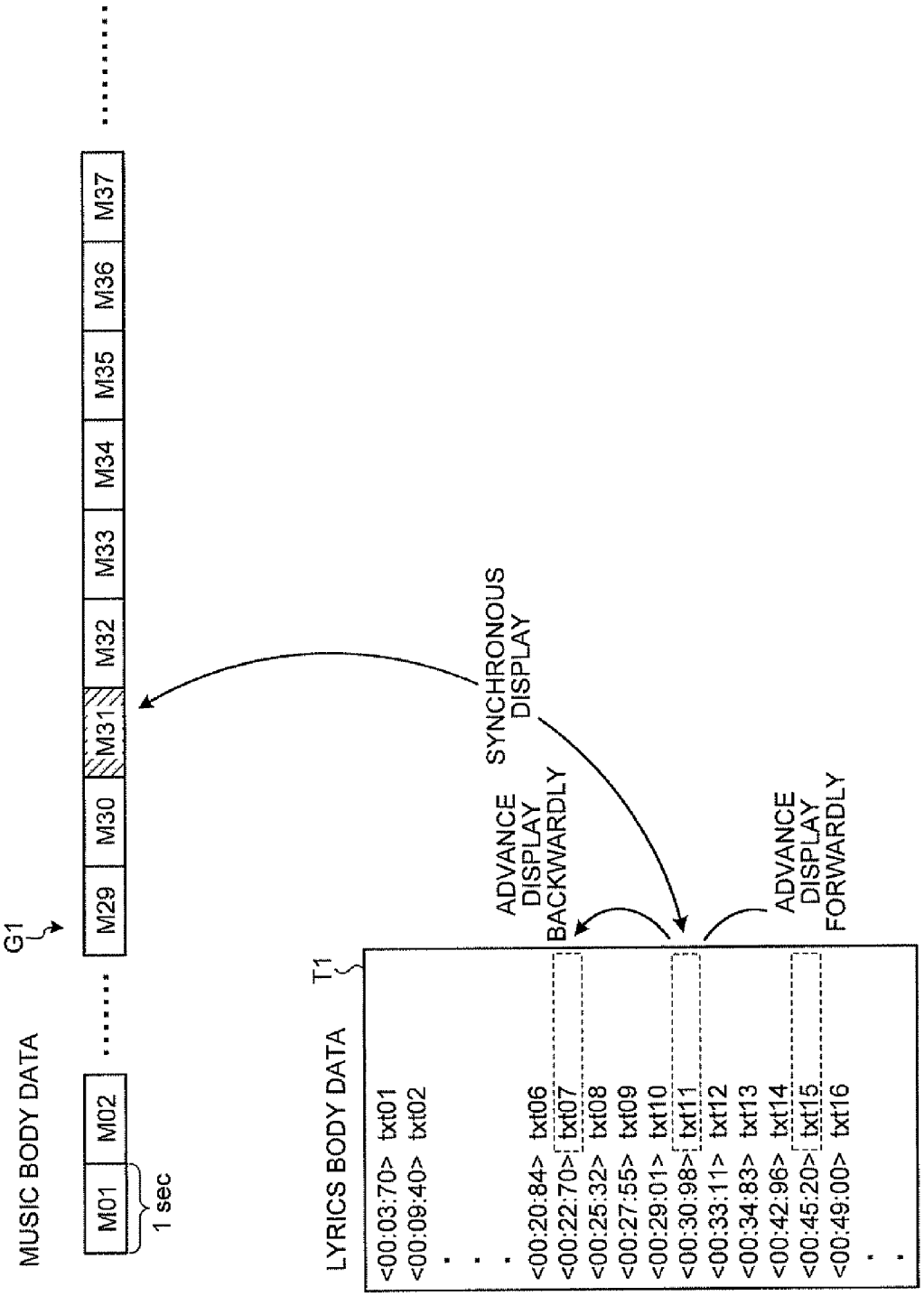
FIG. 6 is a schematic for explaining a content displayed in a lyrics phrase displaying area.

FIG. 6 is a schematic for explaining a content displayed in the lyrics phrase displaying area. Upon displaying the lyrics data in synchronization with the replay of the music data, the synchronous display unit 24 selects a phrase corresponding to the replayed portion, and the selected lyrics phrase is displayed in the lyrics phrase display area. FIG. 6 depicts the 32nd frame M32 included in the music body data G1 being output. The frame M32 corresponds to the 32nd second from the beginning of the performance. Thus, the synchronous display unit 24 selects txt11 from the body data T1 in the lyrics data as a lyrics phrase corresponding to the replayed portion, and displays the txt11 in the lyrics phrase displaying area 65.

If the display advancement operation detecting unit 26 detects a display advancement operation, the display advancement controlling unit 28 changes the selected lyrics phrase using the lyrics phrase that is currently selected as a point of origin. More specifically, the display advancement controlling unit 28 performs either a fast-forward display or a fast-rewind display. In the fast-forward display, the display advancement controlling unit 28 selects a lyrics phrase in the forward direction in the replay. In the fast-rewind display, the display advancement controlling unit 28 selects a lyrics phrase in the backward direction in the replay, using the portion currently being replayed as the point of origin.

In other words, the fast-forward display is a display advancement in which the display is advanced in the direction forward from the portion currently being replayed, and the fast-rewind display is a display advancement in which the display is advanced in the direction backward from the portion currently being replayed. In the fast-forward display or the fast-rewind display, only the display of the lyrics phrases is fast-forwarded or fast-rewound, and the music continues to be replayed without being fast-forwarded or fast-rewound. This display scheme of selecting a lyrics data other than the one corresponding to the replayed portion is referred to as asynchronous display.

In the example of FIG. 6, if the display is advanced backwardly, txt07 that is the lyrics phrase corresponding to the portion already replayed is selected; and if the display is advanced forwardly, txt15 that is the lyrics phrase which corresponds to a portion after the portion being replayed is selected.

In the display advancement, the amount of the display advancement that is the distance between the lyrics phrase currently selected being the point of origin and the lyrics phrase to which the display is advanced is determined based on the amount of the display advancement operation. The amount of the display advancement may be the number of lyrics phrases, the number of lines thereof, or the corresponding replay time.

Figure 7:
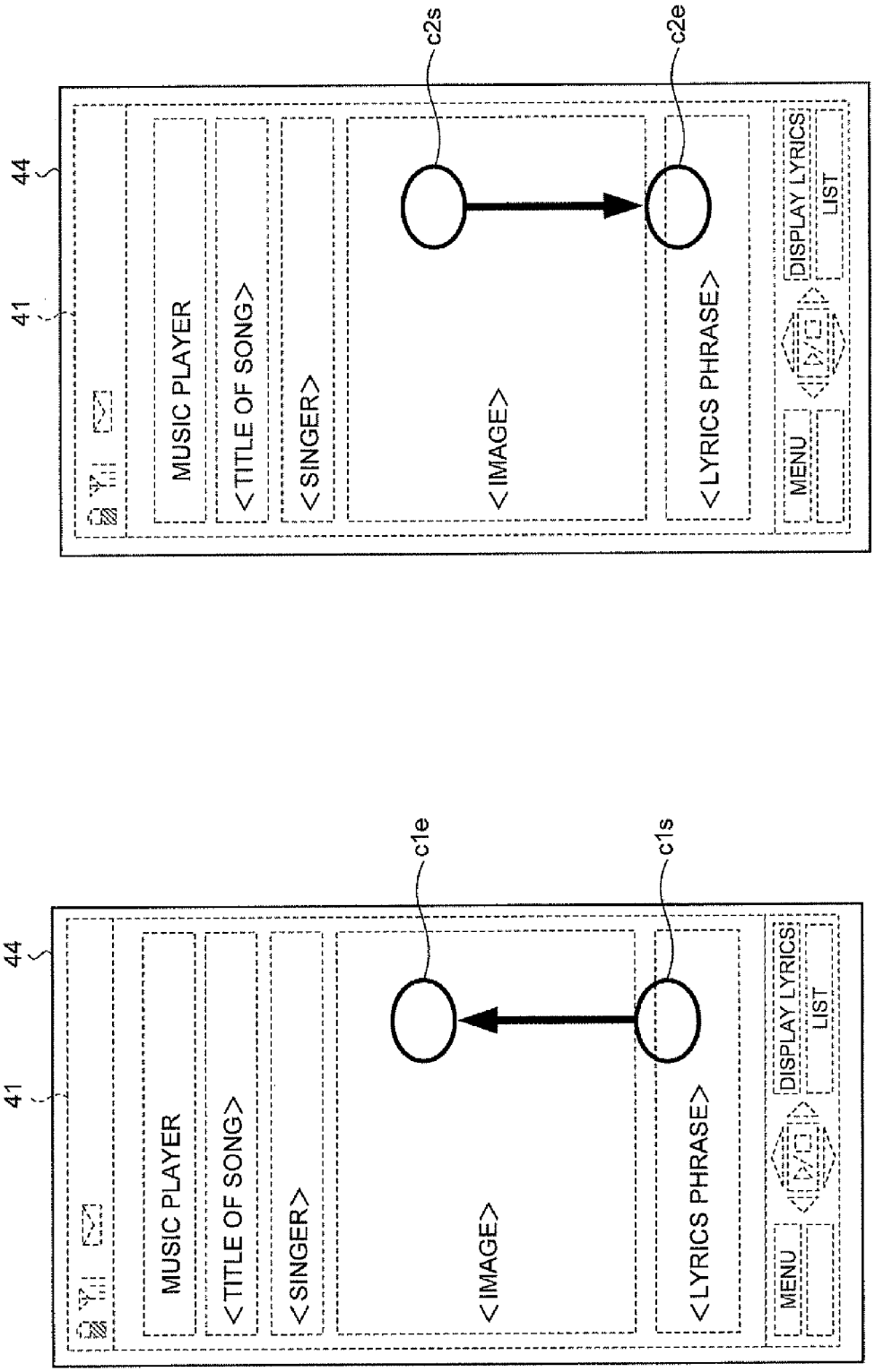
FIG. 7 is a schematic for explaining a case in which the distance between a contact starting point and a contact ending point on a touch panel is used as an operated amount.

FIG. 7 is a schematic for explaining a case in which the distance between a contact starting point and a contact ending point on the touch panel is used as the operated amount. In FIG. 7, the touch panel 44 is layered on the display 41. Assuming that the touch panel 44 detects a contact at a contact starting point c1s, the detected position of the contact moves, and the contact ends at a contact ending point c1e, the operated amount determining unit 27 uses the distance between the contact starting point c1s and the contact ending point c1e as the operated amount upon determining the amount of the display advancement. Because the direction of the movement from the contact starting point c1s to the contact ending point c1e is toward the top of the display 41, the display advancement operation detecting unit 26 detects this operation as a display advancement operation for executing the fast-rewind display. The display advancement operation detecting unit 26 may also determine if the operation is the display advancement operation based on whether the contact starting point c1s or the contact ending point c1e is in an area corresponding to the lyrics phrase displaying area 65.

Similarly, assuming that the touch panel 44 detects a contact at a contact starting point c2s, the detected position of the contact moves, and the contact ends at a contact ending point c2e, the operated amount determining unit 27 uses the distance between the contact starting point c2s and the contact ending point c2e as the operated amount upon determining the amount of the display advancement. Because the direction of the movement from the contact starting point c2s to the contact ending point c2e is toward the bottom of the display 41, the display advancement operation detecting unit 26 handles this operation as a display advancement operation for executing the fast-forward display. The display advancement operation detecting unit 26 may also determine if an operation is the display advancement operation based on whether the contact starting point c2s or the contact ending point c2e is in an area corresponding to the lyrics phrase displaying area 65.

Figure 8:
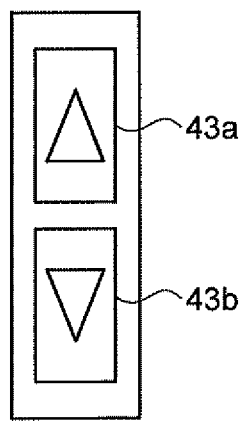
FIG. 8 is a schematic of an example of an operation key used for entering a display advancement operation.

FIG. 8 depicts an example of an operation key used for entering a display advancement operation. An operation key 43a illustrated in FIG. 8 is a button given with a symbol indicating an upper direction of the display 41; and an operation key 43b is a button given with a symbol indicating a lower direction of the display 41.

The display advancement operation detecting unit 26 detects a pressing operation on the operation key 43a as a display advancement operation for executing the fast-rewind display. The operated amount determining unit 27 uses the length of time the operation key 43a is pressed as the operated amount upon determining the amount of the display advancement. Similarly, the display advancement operation detecting unit 26 detects a pressing operation on the operation key 43b as a display advancement operation for executing the fast-forward display. The operated amount determining unit 27 uses the length of time the operation key 43b is pressed as the operated amount upon determining the amount of the display advancement. The operation keys 43a and 43b may be virtual buttons that are realized by combining images of operation keys displayed on the display 41 and detected positions of contacts on the touch panel.

The relationship between an operated amount and the amount of the display advancement, that is the relationship between the operation time or the operation distance and the amount of the display advancement is set in advance. It is also preferable that the relationship between the operated amount and the amount of the display advancement can be changed by a user operation.

Figure 9:
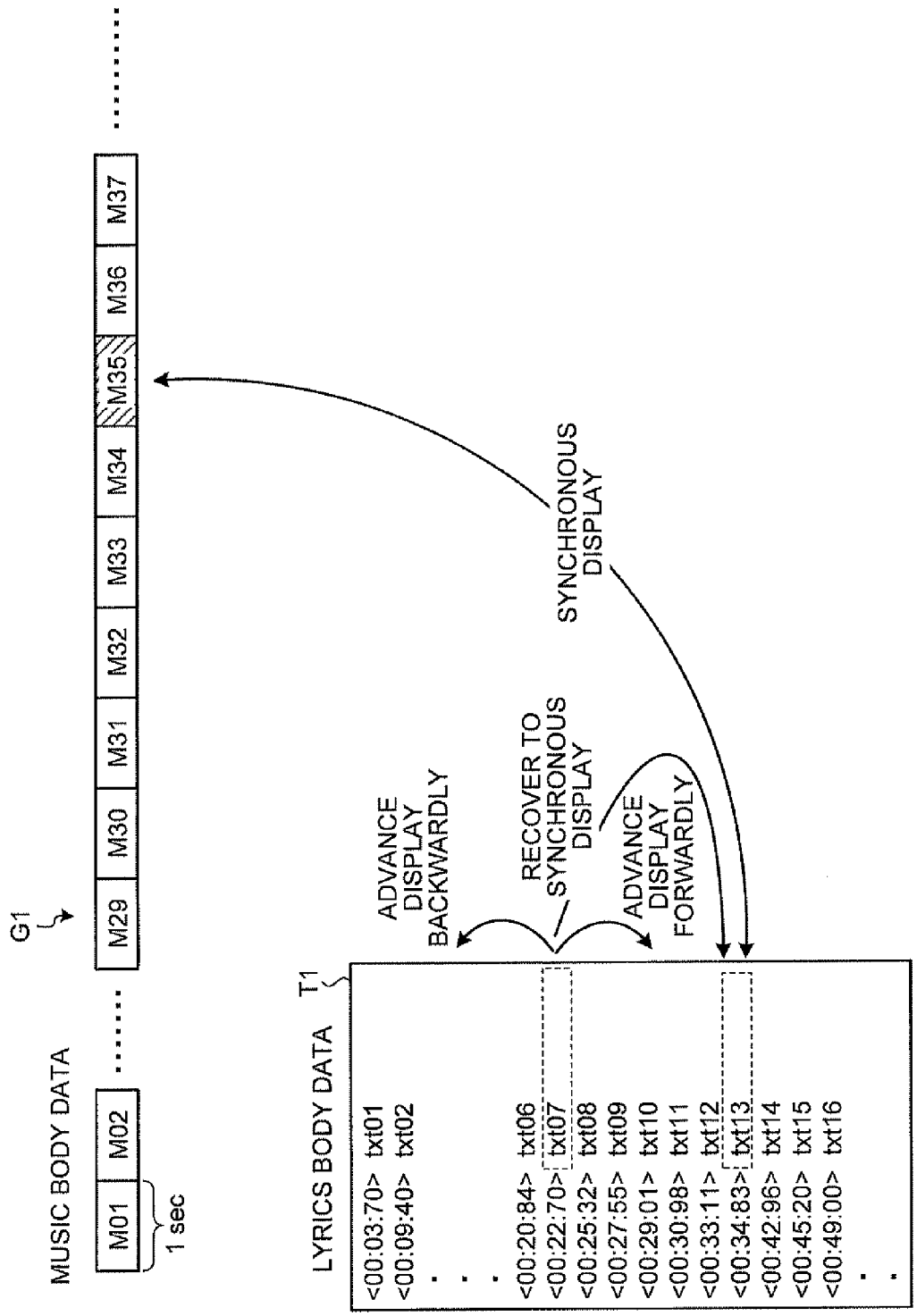
FIG. 9 is a schematic for explaining an operation after the display advancement control.

FIG. 9 is an illustrative schematic of an operation after the display advancement control. If a predetermined time elapses since the display advancement has been executed to select a lyrics phrase other than the one corresponding to the replayed portion, the display advancement controlling unit 28 ends selecting the lyrics phrase other than the one corresponding to the replayed portion. After such a selection is ended, the synchronous display unit 24 returns to the synchronous display. The music is kept replayed while the display advancement is executed. When the process returns to the synchronous display, the synchronous display unit 24 obtains the frame number of the frame that is being output at the time of the return, and selects the lyrics phrase corresponding to the replayed portion.

In the example illustrated in FIG. 9, a frame M36 is being output upon recovering to the synchronous display after the lyrics phrase txt07 is displayed by the display advancement. The frame M36 corresponds to the 36th second in the replay time. Therefore, the synchronous display unit 24 selects the lyrics phrase txt13 corresponding to the 36th second in the replay time from the body data T1 of the lyrics data.

If another display advancement operation is detected before a predetermined time elapses after the display advancement is initiated, the synchronous display unit 24 executes the display advancement again, using the lyrics phrase currently selected as the point of origin.

In the example illustrated in FIG. 9, if another display advancement operation is detected before a predetermined time elapses after the lyrics phrase txt07 is displayed by way of the display advancement, the synchronous display unit 24 executes the display advancement again, using the lyrics phrase txt07 as the point of origin. Therefore, if the display advancement operation is an operation specifying the fast-rewind display, the lyrics are gone back further from the lyrics phrase txt07 to select another lyrics phrase. If the display advancement operation is an operation specifying the fast-forward display, the lyrics phrase to be selected is changed along the direction of the replay progresses, starting at the lyrics phrase txt07. Therefore, if the operated amount is small, such an operation decreases the amount rewound from the portion being replayed, without going back to the portion currently being replayed.

In this manner, the operability can be improved by selecting a lyrics phrase to be displayed using the lyrics phrase that is currently selected and displayed as the point of origin. Assuming that the direction in which the replay progresses is the downward direction, to see the lyrics prior to the lyrics phrase that is currently being displayed, the user can make an upward operation; and to see the lyrics coming after the lyrics phrase that is currently being displayed, the user can make a downward operation.

Furthermore, upon overwriting the lyrics phrase during the synchronous display, the display can be controlled so that the previous lyrics phrase moves up to disappear, and the next lyrics phrase appears from the bottom. In this manner, the user can recognize that the direction of the progress of the replay is the downward direction.

Figure 10:
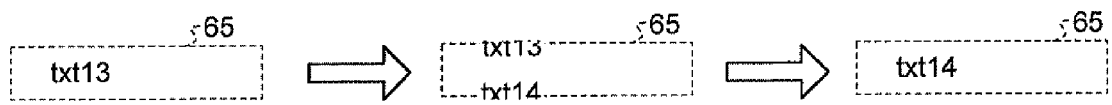
FIG. 10 is a schematic for explaining an example of lyrics phrase updating.

FIG. 10 is a schematic for explaining an example of lyrics phrase updating. The example illustrated in FIG. 10 depicts a scenario in which the display on the lyrics phrase displaying area 65 is rewritten from the lyrics phrase txt13 to the lyrics phrase txt14. The lyrics phrase txt13 moves upwardly, and disappears into the upper edge of the lyrics phrase displaying area 65. The lyrics phrase txt14 appears from the bottom edge of the lyrics phrase displaying area 65 and moves upwardly, and stops at the center of the lyrics phrase displaying area 65.

Figure 11:
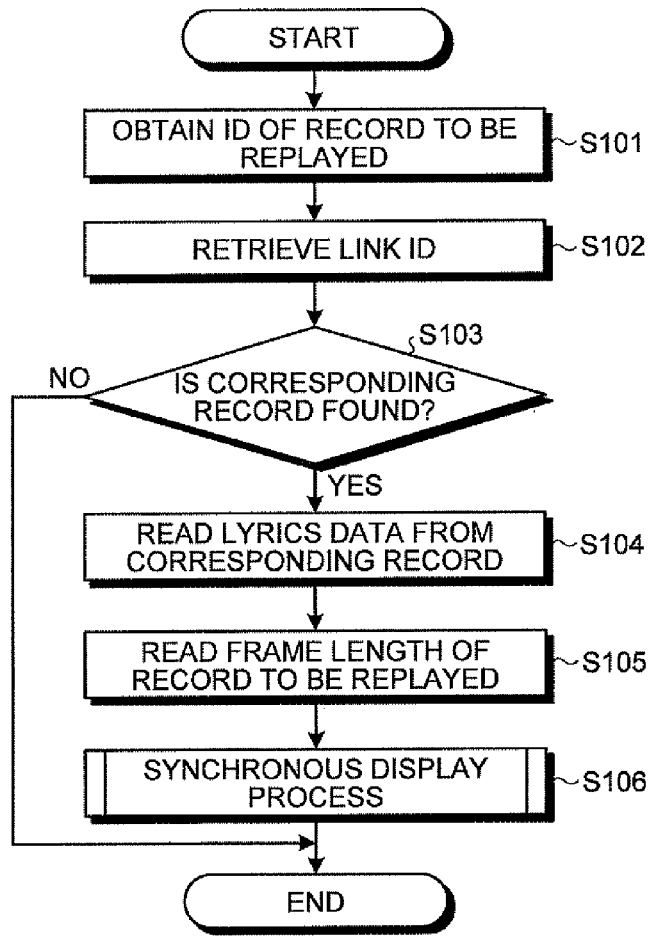
FIG. 11 is a flowchart of an operation performed by a synchronous display unit 24.

An operation executed by the synchronous display unit 24 will now be explained. FIG. 11 is a flowchart of the operation executed by the synchronous display unit 24. The synchronous display unit 24 obtains the ID of the record to be replayed from the replay processing unit 23 (S101), and retrieves a corresponding record having the obtained ID in the column C3 thereof as the link ID (S102). If no corresponding record is found as a result of retrieval (NO at S103), the synchronous display unit 24 ends the process.

On the contrary, if a corresponding record is found (YES at S103), the synchronous display unit 24 reads the lyrics data from the column C2 of the corresponding record (S104). The synchronous display unit 24 also retrieves the record to be replayed from the storage unit 30 based on the ID of the record, and reads the frame length from the metadata of the record to be replayed (S105). The synchronous display unit 24 executes the synchronous display process using the read lyrics data and the frame length (S106), and ends the process.

Figure 12:
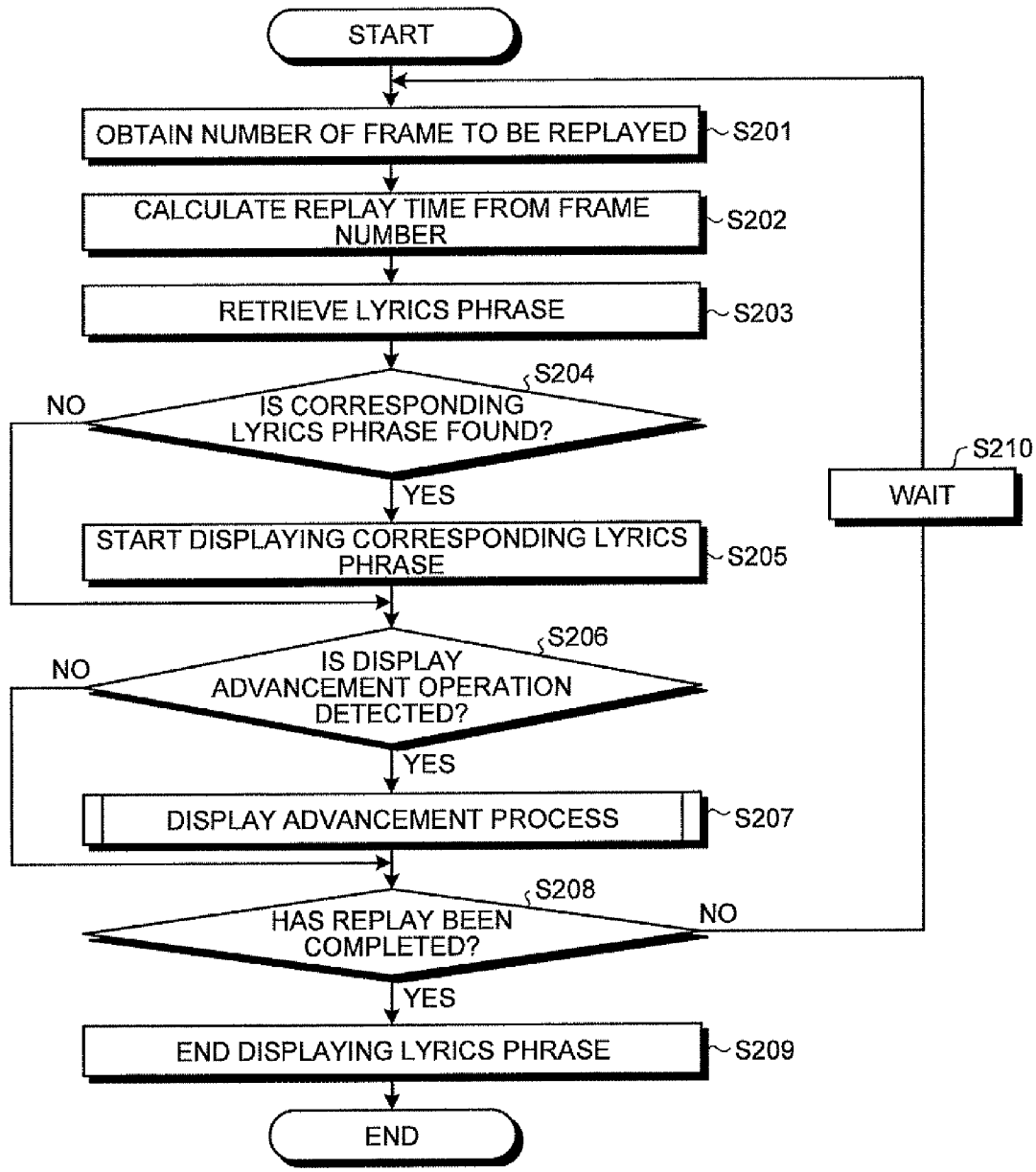
FIG. 12 is a flowchart illustrating in detail a synchronous display process of FIG. 11.

FIG. 12 is a flowchart illustrating the synchronous display process of FIG. 11 in detail. The synchronous display unit 24 obtains the frame number of the frame to be replayed from the replay processing unit 23 (S201).

The synchronous display unit 24 calculates the replay time for the frame based on the obtained frame number and the frame length (S202). The synchronous display unit 24 retrieves a lyrics phrase having a display start time closest and corresponds to the search range from the current frame to the 1st frame (S203).

If any lyrics phrase is found to have a display start time closest and corresponds to the search range from the current frame to the 1st frame (YES at S204), the synchronous display unit 24 starts displaying the lyrics phrase (S205). If a prior lyrics phrase is being displayed upon starting displaying the lyrics phrase, the displayed prior lyrics phrase is deleted and updated.

After completing Step S205, or if no lyrics phrase is found to have a display start time closest and corresponds to the search range from the current frame to the 1st frame (NO at S204), the display advancement operation detecting unit 26 detects an input of a display advancement operation (S206). If the display advancement operation detecting unit 26 detects a display advancement operation (YES at S206), the synchronous display unit 24 executes the display advancement process (S207).

After the display advancement process is completed, or if no display advancement operation is detected (NO at S206), the synchronous display unit 24 determines if the replay processing unit 23 has completed replaying the entire music data (S208).

If the replay of the music data has not been completed (NO at S208), the synchronous display unit 24 waits until the frame completes (S210), and then obtains the next frame number again (S201). If the replay of the music data has been completed (YES at S208), the synchronous display unit 24 ends displaying the lyrics phrase (S209).

Figure 13:
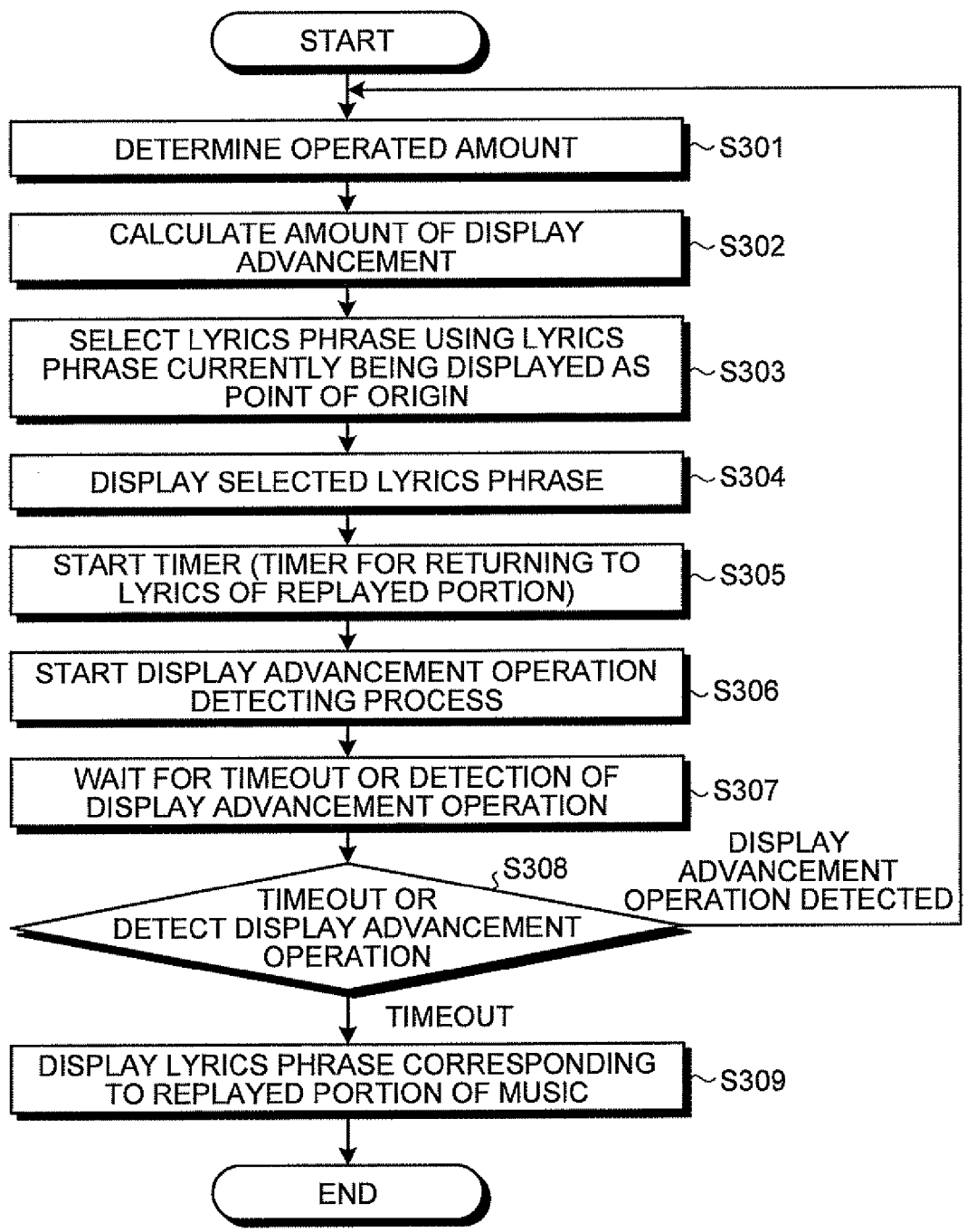
FIG. 13 is a flowchart illustrating in detail a display advancement process of FIG. 12.

FIG. 13 is a flowchart illustrating the display advancement process of FIG. 12 in detail. In the display advancement process, to begin with, the operated amount determining unit 27 determines the operated amount of the display advancement operation (S301). The display advancement controlling unit 28 calculates the amount of display advancement based on the operated amount (S302).

The display advancement controlling unit 28 then uses the lyrics phrase that is currently being displayed as the point of origin to select a lyrics phrase separated therefrom by the amount of the display advancement in the direction detected by the display advancement operation detecting unit 26 (S303). To display the selected lyrics phrase, the display advancement controlling unit 28 instructs the output controlling unit to display the lyrics phrase (S304).

A timer that corresponds to predetermined time is then started to keep the selected phrase displayed for the predetermined time, and to display the lyrics phrase corresponding to the currently replayed portion after the predetermined time has elapsed (S305). The display advancement operation detecting unit 26 starts the process for detecting an input of the display advancement operation (S306), and stands by for either a timeout or a detection of a display advancement operation (S307).

While waiting, if the display advancement operation detecting unit 26 detects a display advancement operation (S308), the system control returns to the operated amount determining process performed by the operated amount determining unit 27 (S301). If the predetermined time has elapsed since the display is made (S308), the display advancement controlling unit 28 selects the lyrics phrase corresponding to the portion of the music currently being replayed, instructs the output controlling unit 25 to display the lyrics phrase (S309), and ends the process.

As illustrated in FIG. 12, during the synchronous display, the synchronous display unit 24 causes the lyrics to be displayed in synchronization with the frame number of the frame to be output. Therefore, when the replay of the music is fast-forwarded or fast-rewound, the corresponding lyrics can be displayed following the progress of the music.

On the contrary, as illustrated in FIG. 13, in the asynchronous display, the synchronous display unit 24 can cause the lyrics corresponding to the portion not being replayed to be displayed without affecting the replay of the music.

In the example described above, a single line of lyrics is displayed in the lyrics phrase displaying area; however, a plurality of lines of lyrics may be displayed depending on the size of the available lyrics phrase displaying area.

Figure 14:
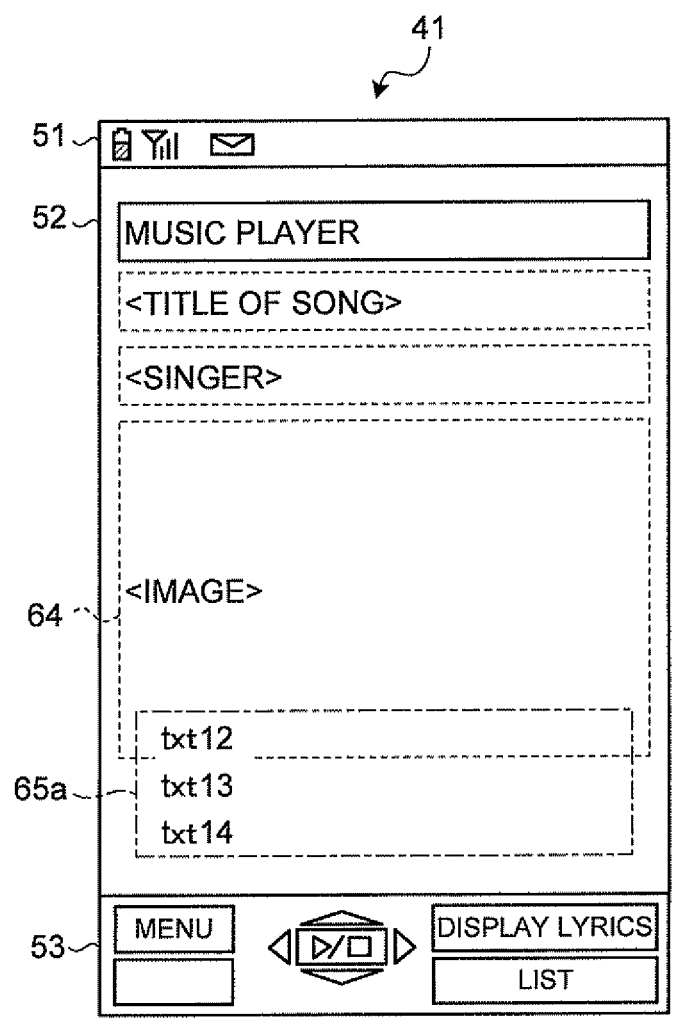
FIG. 14 is a schematic of an example in which a plurality of lines of lyrics is displayed in a lyrics phrase displaying area.

FIG. 14 depicts an example in which lyrics are displayed in a plurality of lines in the lyrics phrase displaying area. In the example illustrated in FIG. 14, a lyrics phrase displaying area 65a is generated in the main display area 52, partially overlapping with the image displaying area 64, to display three lines of lyrics on the display 41.

Figure 15:
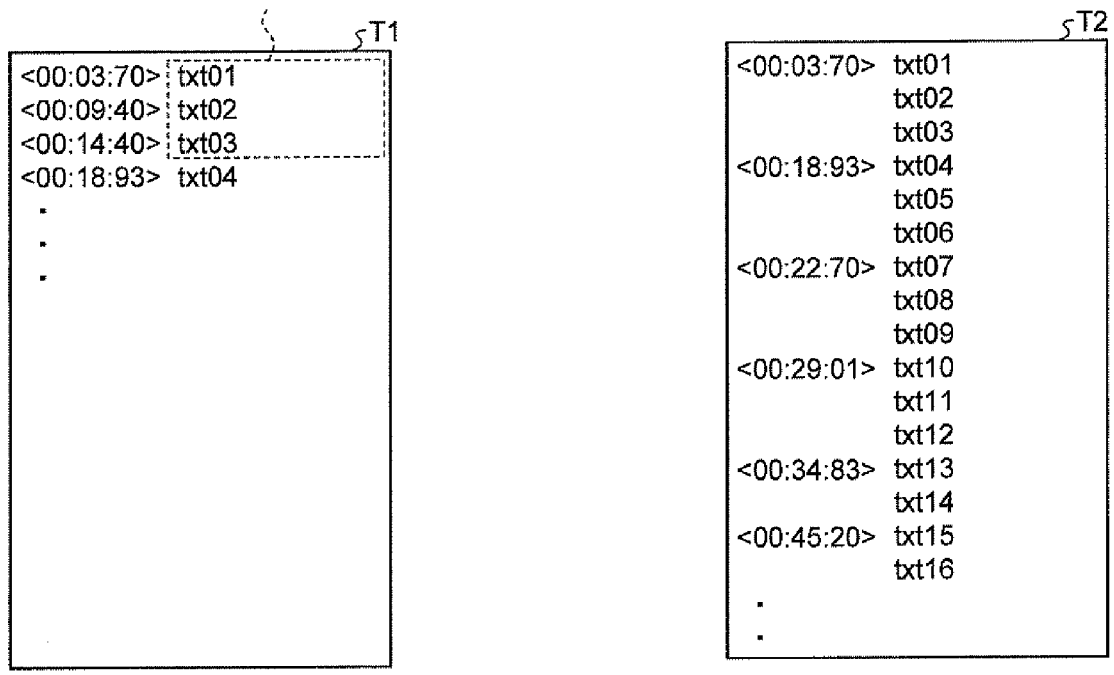
FIG. 15 is a schematic for explaining a process performed when the lines of the lyrics phrases are displayed.

FIG. 15 is a schematic for explaining the process performed when the lyrics phrases are displayed in a plurality of lines. If a display start time is specified to each of a single-line worth of the lyrics phrase in the lyrics body data T1, three-line of the lyrics phrases, including the one corresponding to the replayed portion of the music, can be read for a single display.

Alternatively, as illustrated in lyrics body data T2, a display start time can be specified to each set of three-line worth of the lyrics phrases that can be displayed in the lyrics phrase displaying area 65a at one time; however, it is still possible to specify a display start time to each set of one- or two-line worth of the lyrics phrases, e.g., txt13 and txt14.

Furthermore, the size of the lyrics phrase displaying area may be changed for the synchronous display and the asynchronous display.

Figure 16:
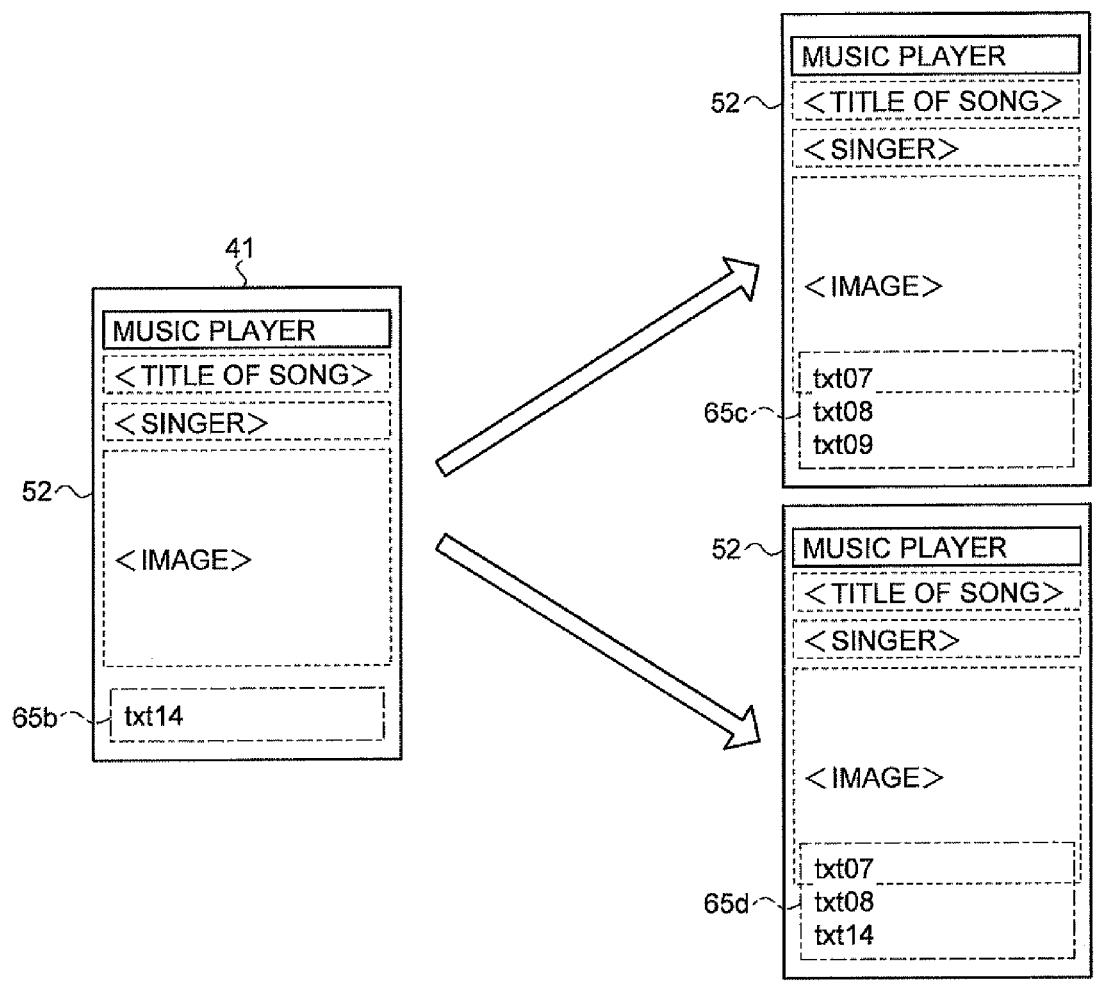
FIG. 16 is a schematic for explaining a case in which the size of the lyrics phrase displaying area is changed upon executing a fast-rewind display.

FIG. 16 is a schematic for explaining a scenario in which the size of the lyrics phrase displaying area is changed upon executing the fast-rewind display. In the example illustrated in FIG. 16, during the synchronous display, the display area generating unit 29 generates a lyrics phrase displaying area in the size of a single line in the main display area 52 on the display 41. During the asynchronous display, the display area generating unit 29 generates a lyrics phrase displaying area in the size of three lines in the main display area 52 on the display 41.

A lyrics phrase displaying area 65b during the synchronous display displays therein a lyrics phrase txt14 corresponding to the replayed portion. If the fast-rewind display is performed at this time, the entire lyrics phrase displaying area may either be used for displaying the previous lyrics phrase, or displaying both of the previous lyrics phrase and the lyrics phrase corresponding to the replayed portion.

For example, a lyrics phrase displaying area 65c uses the entire lyrics phrase displaying area 65c to display the previous lyrics phrases, to display lyrics phrases txt07 to 09. On the contrary, a lyrics phrase displaying area 65d displays therein both of the previous lyrics phrases txt07 to 08, and the lyrics phrase txt14 corresponding to the replayed portion.

Figure 17:
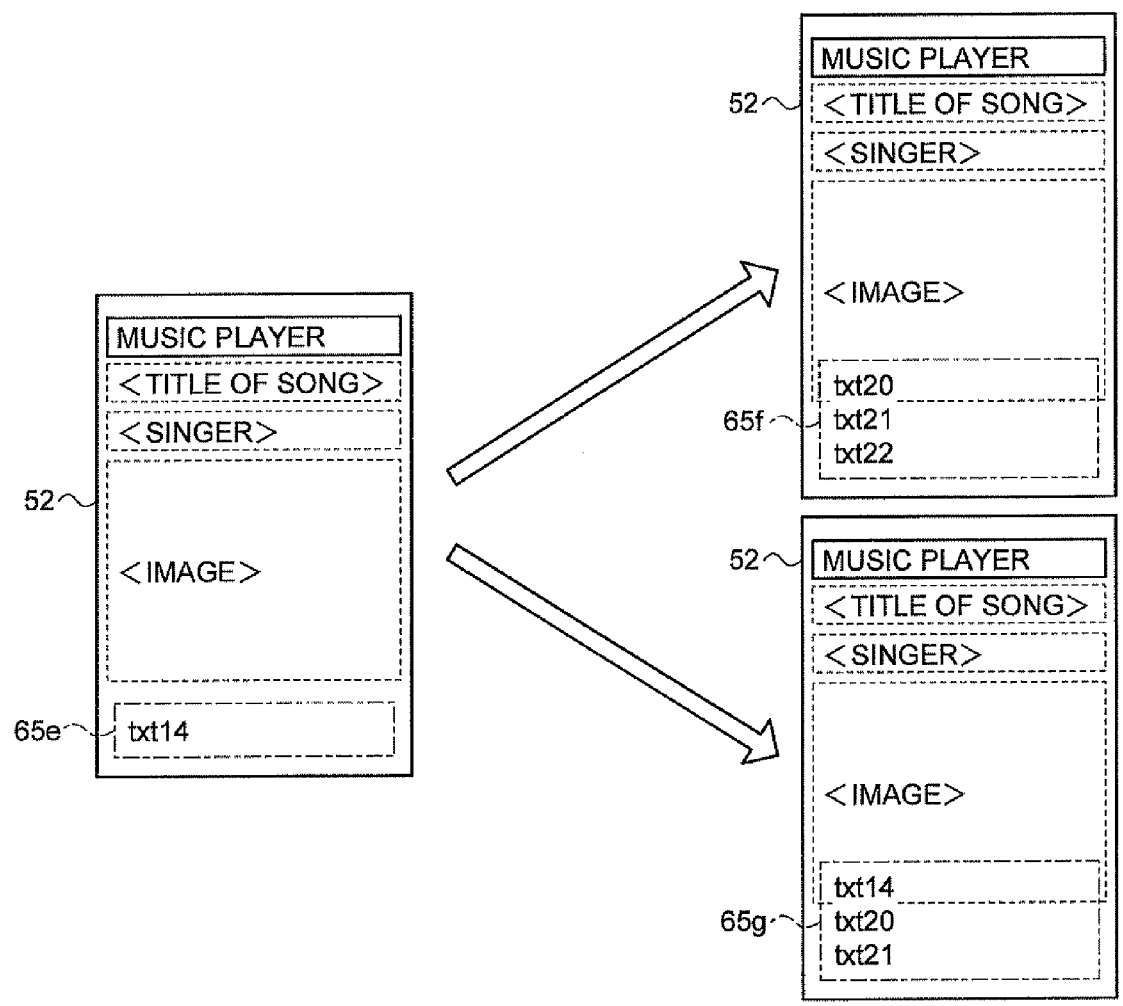
FIG. 17 is a schematic for explaining a case in which the size of the lyrics phrase displaying area is changed upon executing a fast-forward display.

FIG. 17 is an illustrative schematic of a scenario in which the size of the lyrics phrase displaying area is changed upon executing the fast-forward display. In the example illustrated in FIG. 17, during the synchronous display, the display area generating unit 29 generates a lyrics phrase displaying area having the size of a single line in the main display area 52 on the display 41. During the asynchronous display, the display area generating unit 29 generates a lyrics phrase displaying area having the size of three lines in the main display area 52 on the display 41.

A lyrics phrase displaying area 65e displays therein the lyrics phrase txt14 corresponding to the replayed portion during the synchronous display. If the fast-forward display is executed at this time, the entire lyrics phrase displaying area may either be used for displaying the following lyrics phrase, or displaying both of the following lyrics phrase and the lyrics phrase corresponding to the replayed portion.

For example, a lyrics phrase displaying area 65f displays therein lyrics phrases txt20 to 22, using the entire lyrics phrase displaying area 65f for displaying the following lyrics phrases. On the contrary, a lyrics phrase displaying area 65g displays therein both of the lyrics phrase txt14 corresponding to the replayed portion and the following lyrics phrase txt20 to 21.

When the display advancement causes both of the lyrics phrase corresponding to the replayed portion and one other than the one corresponding to the replayed portion to be displayed, the lyrics phrase corresponding to the replayed portion may be displayed at a fixed position, or the position may be adjusted depending on the order of the lyrics phrases. In the example illustrated as the lyrics phrase displaying area 65g, to adjust the order of the lyrics phrases, the lyrics phrase txt14 is displayed at a different position.

The lyrics phrase corresponding to the replayed portion and that corresponding to the portions other than the replayed portion may be displayed to have different appearances. For example, different colors, sizes, fonts, or decorations of the characters may be used. In this manner, by changing the appearances, one can easily recognize if the lyrics being displayed is corresponding to the replayed portion. Furthermore, by making the appearance in the fast-forward display and that in the fast-rewind display different, one can easily recognize the contextual relationship between the portion being replayed and the lyrics being displayed. The different appearance is effective not only when the lyrics phrase corresponding to the replayed portion is displayed with that corresponding to the portions other than the replayed portion, but also when lyrics corresponding to the replayed portion are not displayed in the display advancement.

As described above, according to the first embodiment, upon being requested to display lyrics for portions other than the one being replayed while replaying the music data and the lyrics data synchronously, the mobile telephone 1 displays thereon the lyrics for the portions other than the one being replayed in a displaying area where the lyrics of the replayed portion have been displayed.

Therefore, the lyrics corresponding to the portions other than the one being replayed can be displayed effectively even in a small-sized display. Thus, a cost increase due to higher pricing of the display itself can be avoided, without losing the portability due to the enlarged size of the package.

Furthermore, because a plurality of display areas does not need to be provided, an incorrect operation, caused by the user being confused about the displayed contents, can be avoided without sacrificing other displayed contents such as a video, and both of the user operation and the internal operation can be simplified. In addition, because the lyrics are selected and displayed actually using the lyrics currently being displayed as the point of origin, the contextual relationship thereof with the replayed portion is kept clear even during the asynchronous display, and easily understood by the user. In this manner, the operability can be improved.

The first embodiment is only one example, and the technology disclosed herein can be implemented with necessary variations. For example, the first embodiment uses an exemplary configuration in which both of the music data and the lyrics data are stored in the storage unit 30; however, the music data and the lyrics data can be stored in a distributive manner in a plurality of storages. Furthermore, the storage for storing therein the music data may be separated from the storage for storing therein the lyrics data.

Moreover, in the first embodiment, music data is used as an example of the content data, and lyrics data is used as the text data that is an example of associated data. Such data is given by way of example, and any contents whose output changes over time can be used as the text data. Similarly, any data whose displayed contents changes in synchronization with replay of the content data may be used as the text data. Furthermore, the content data do not necessary have to accompany any sound output, and may be the data with only displayed contents that change over time.

For example, the technology disclosed herein may apply a movie as the content data, and subtitles as the text data. Alternatively, the content data may be a video given with text information such as captions.

Furthermore, in the first embodiment, the content data and the text data are explained to be in one-to-one correspondence; however, the correspondence between the content data and the text data is not limited to one-to-one. For example, assuming that the content data is a movie, it is useful if a plurality of text data, such as English subtitles and Japanese subtitles, is corresponded thereto. Furthermore, different lyrics may be given to the same music. Similarly, as long as the lyrics and the timing at which the lyrics are displayed are the same, a plurality of pieces of music data, such as those arranged differently e.g., in the rhythm thereof, may be corresponded to a single piece of text data.

In addition, in the first embodiment, the mobile telephone is described as an example of the portable information processing apparatus; however, the technology disclosed herein can be applied to any kind of the portable information processing apparatus such as a PDA or a portable music player. Furthermore, the technology disclosed herein can be provided as a program including the replay processing program 23*a*, the synchronous displaying program 24*a*, and the output controlling program 25*a*.

[b] Second Embodiment

In the first embodiment, the lyrics are displayed as the associated information together with replay of the music; however, the portable information processing apparatus disclosed herein may display thereon guitar chords of the music in addition to the lyrics. Therefore, in an example explained in a second embodiment of the present invention, lyrics and guitar chords are sequentially displayed together with replay of the music.

Figure 18:
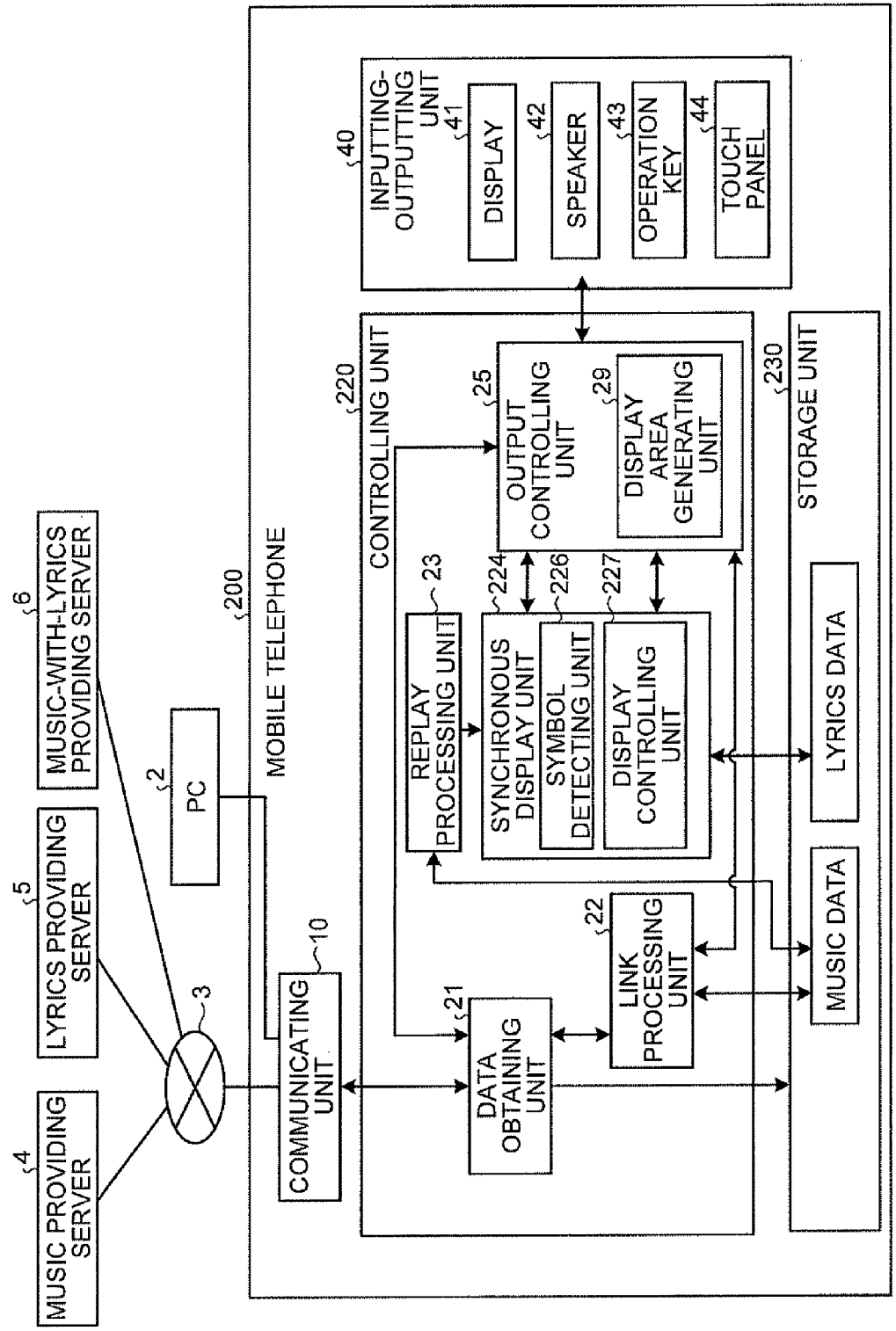
FIG. 18 is a schematic of a mobile telephone according to a second embodiment of the present invention.

FIG. 18 is a schematic of a configuration of a mobile telephone that is a portable information processing apparatus according to the second embodiment. A mobile telephone 200 illustrated in FIG. 18 includes therein the communicating unit 10, the inputting-outputting unit 40, a controlling unit 220, and a storage unit 230. The parts having the same functions as those that have been disclosed with reference to FIG. 1 will be given the same reference numbers below, and the detailed explanation thereof will be omitted herein.

The storage unit 230 stores therein the music data and the lyrics data. Generally, a mobile telephone has a storage medium that a user can use for storing therein any data, such as image or telephone number data. In FIG. 18, the storage unit 230 in which a user can store any data is illustrated to store therein the music data and the lyrics data. A depiction of and an explanation about other data stored in the storage unit 230 are omitted herein.

The structures of the music data and the lyrics data are the same as the examples illustrated in FIG. 3; however, the body data in the lyrics data according to the second embodiment further include: a set of phrases including lyrics and guitar chords; and the display start time, which is the information indicating the timing for display, for each of the phrases.

FIG. 19 is a schematic of an example of the lyrics data. The lyrics data illustrated in FIG. 19 includes double integral signs as special symbols indicating that a guitar chords is embedded therein. More specifically, in the lyrics data illustrated in FIG. 19, a guitar chord is illustrated as a character arranged between a double integral sign appearing at the odd-numbered position from the left and another double integral sign appearing at the even-numbered position from the left. By contrast, in the example illustrated in FIG. 19, the lyrics are illustrated as characters other than those arranged between the double integral signs, or characters arranged between a double integral sign appearing at the even-numbered position from the left and another double integral sign appearing at the odd-numbered position from the left.

For example, in the fourth line of the lyrics data illustrated in FIG. 19, the character "C" arranged between the first and the second double integral signs from the left is a guitar chord. In the fourth line of the lyrics data illustrated in FIG. 19, the characters "DE N DE N MU SHI MU SHI KA TA TSU MU" arranged between the second and the third double integral signs from the left represent the lyrics. In the fourth line of the lyrics data illustrated in FIG. 19, the characters "Dm7" arranged between the third and the fourth double integral signs from the left are a guitar chord. In the fourth line of the lyrics data illustrated in FIG. 19, the character "RI" not arranged between the double integral signs represents the lyrics. In this manner, the guitar chords are embedded in the lyrics, in the lyrics data stored in the storage unit 230.

The controlling unit 220 is a controlling unit that controls the operation performed by the mobile telephone 200. The controlling unit 220 includes, as a function of a general mobile telephone, a function to connect to a mobile telephone network provided by a mobile telephone service provider to establish a call. An explanation about the calling function is omitted herein; and a processing unit related to the music data and the lyrics data handling will now be explained.

The controlling unit 220 includes therein the data obtaining unit 21, the link processing unit 22, the replay processing unit 23, the output controlling unit 25, and a synchronous display unit 224.

The synchronous display unit 224 is a processing unit that causes the lyrics data to be displayed in synchronization with the music data replayed by the replay processing unit 23. More specifically, the synchronous display unit 224 retrieves the storage unit 230 for corresponding lyrics data based on the music data identifying information received from the replay processing unit 23. The synchronous display unit 224 then sequentially causes a plurality of lyrics phrases contained in the lyrics data to be displayed in synchronization with the progress of the music data replayed by the replay processing unit 23. More specifically, a displaying operation performed by the synchronous display unit 224 is achieved by selecting the lyrics phrases to be displayed and instructing the output controlling unit 25 to display the lyrics phrases.

The synchronous display unit 224 includes therein a symbol detecting unit 226 and a display controlling unit 227. The symbol detecting unit 226 detects the presence of a special symbol indicating that a guitar chord is embedded in the lyrics data representing the lyrics phrases corresponding to the replayed portion of the music data. When a special symbol is detected by the symbol detecting unit 226, the display controlling unit 227 controls to display the guitar chord together with the lyrics contained in the lyrics data.

Figure 20:
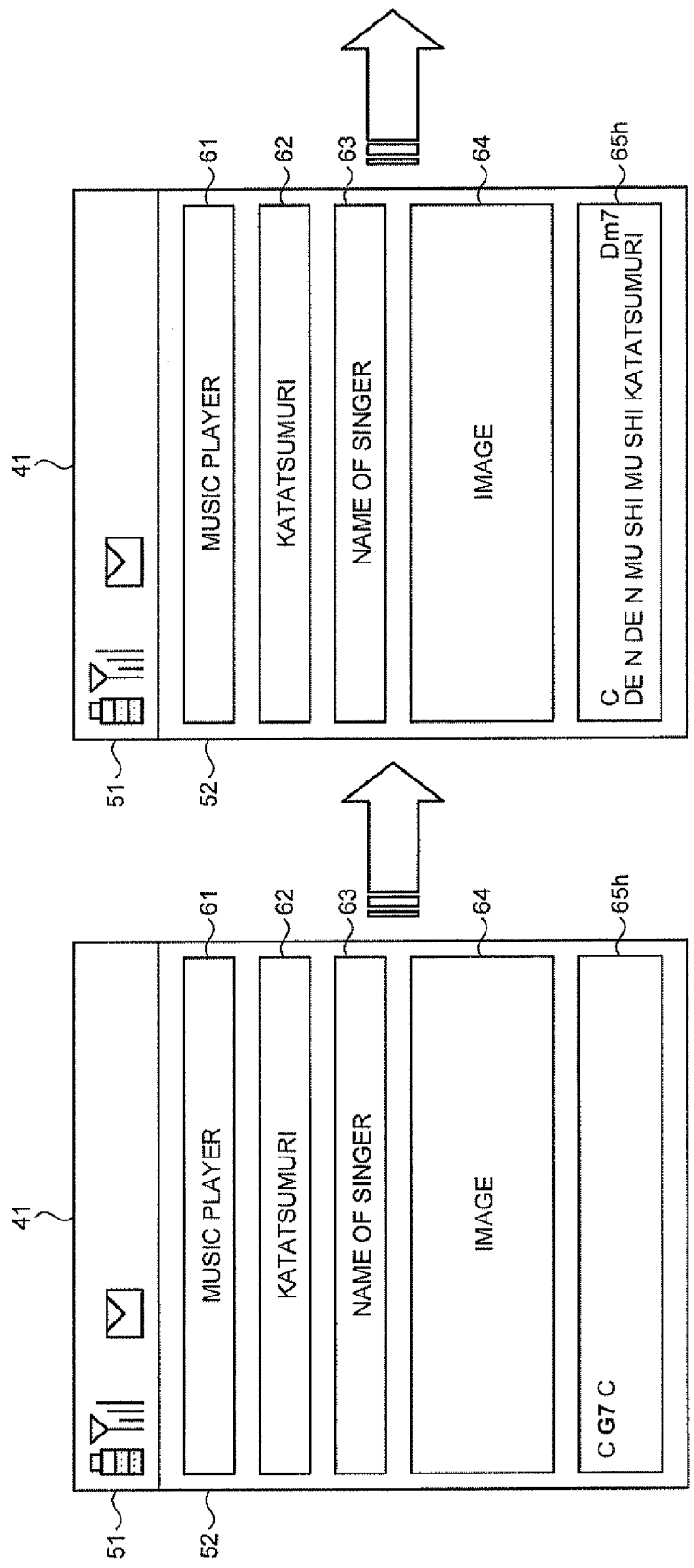
FIG. 20 is a schematic of an example of a display screen during a synchronous display of lyrics and guitar chords.

FIG. 20 is schematics of an example of a display screen during the synchronous display of the lyrics and the guitar chords. The left side in the FIG. 20 depicts a display screen in which the first line of the lyrics data illustrated in FIG. 19 is controlled to be displayed. More specifically, the first line of the lyrics data illustrated in FIG. 19 does not contain any lyrics, but contains the guitar chords "C G7 C2". Thus, the display controlling unit 227 controls to display the guitar chords "C G7 C" only in a lyrics phrase displaying area 65*h*. A display screen such as one illustrated at the left in FIG. 20 would be displayed during a period without any lyrics, e.g., during an prelude, an interlude, or a postlude of a piece of music.

The right side in FIG. 20 depicts an example of a display screen in which the fourth line of the lyrics data illustrated in FIG. 19 is controlled to be displayed. More specifically, the fourth line of the lyrics data illustrated in FIG. 19 contains the lyrics "DE N DE N MU SHI MU SHI KA TA TSU MU" following the guitar chord "C". Thus, the display controlling unit 227 controls to display the lyrics "DE N DE N MU SHI MU SHI KA TA TSU MU" as well as to display the guitar chord "C" above the head of the lyrics, "DE", in the lyrics phrase displaying area 65*h*. The fourth line of the lyrics data illustrated in FIG. 19 also contains the lyrics "RI" following the guitar chord "Dm7". Therefore, the display controlling unit 227 controls to display the lyrics "RI" in the lyrics phrase displaying area 65*h*, as well as to display the guitar chord "Dm7" above the lyrics "RI".

Figure 21:
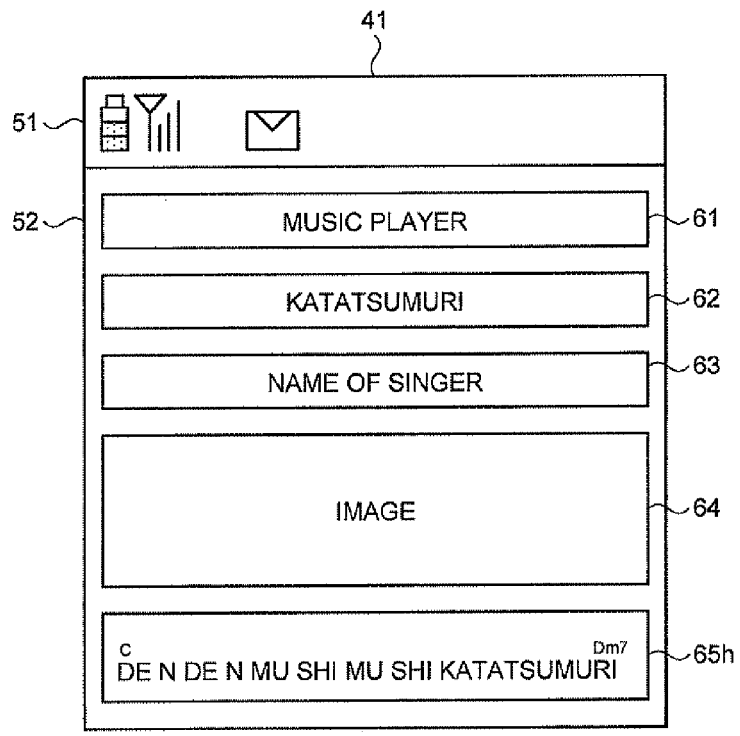
FIG. 21 is a schematic of an example of a display screen indicating guitar chords as ruby above lyrics.

In this manner, the display controlling unit 227 controls to display the lyrics and the guitar chords in the lyrics phrase displaying area 65*h*. In the example illustrated in FIG. 20, the display controlling unit 227 displays the guitar chords in an upper line in the lyrics phrase displaying area 65*h*, and the lyrics in a lower line therein. The display controlling unit 227 may also control to display the guitar chords above the lyrics in the same line. FIG. 21 is a schematic of an example of a display screen indicating the guitar chords above the lyrics in the same line. In the example illustrated in FIG. 21, the display controlling unit 227 controls to display the guitar chords above the lyrics in the same line using ruby.

Figure 22:
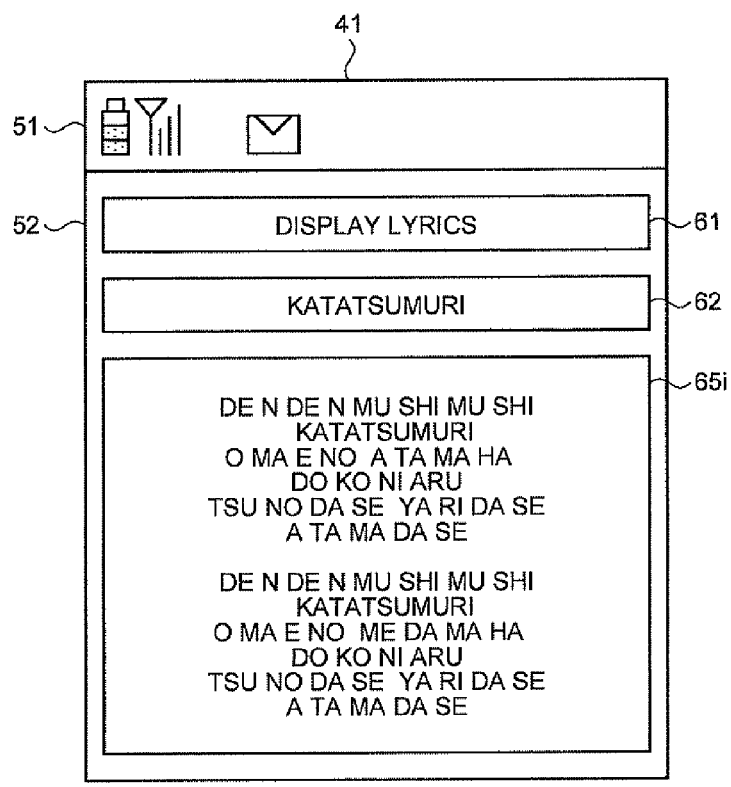
FIG. 22 is a schematic of an example of a display screen presenting lyrics only.

If the user makes an operation to display lyrics only, the display controlling unit 227 controls to display the lyrics, without controlling to display the guitar chords. FIG. 22 is a schematic of an example of a display screen presenting lyrics only. In the example illustrated in FIG. 22, the display controlling unit 227 controls to display "DISPLAY LYRICS" in the function name displaying area 61, as information indicating that the screen is displaying only the lyrics. In the example illustrated in FIG. 22, the display controlling unit 227 deletes the image displaying area 64, and enlarges the size of a lyrics phrase displaying area 65*i*. The display controlling unit 227 then deletes the guitar chords contained in the lyrics data, and controls to display only the lyrics in the lyrics phrase displaying area 65*i*.

The hardware configuration of the mobile telephone 200 is the same as that of the mobile telephone 1 illustrated in FIG. 2.

Figure 23:
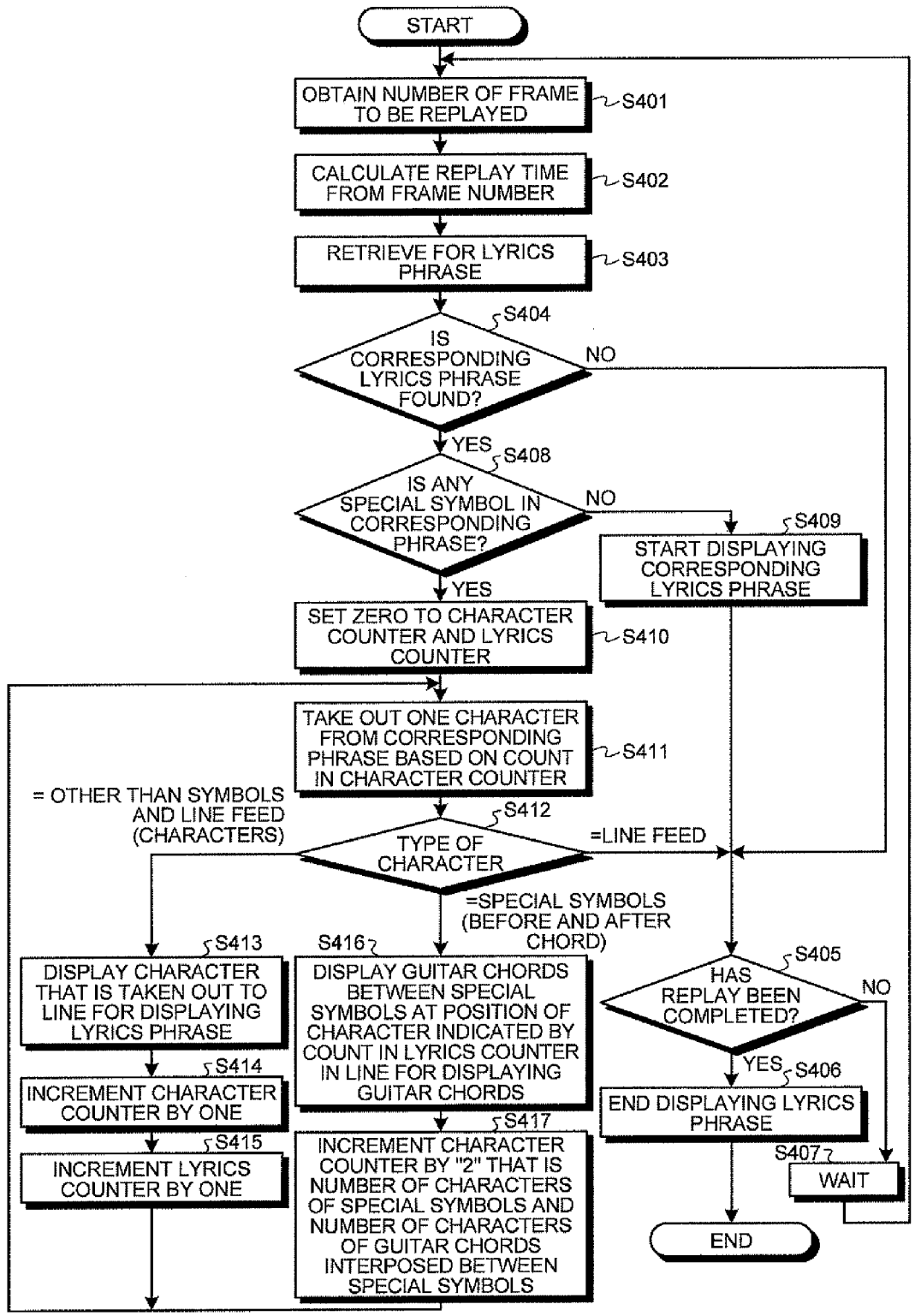
FIG. 23 is a flowchart of a synchronous display process performed by the mobile telephone according to the second embodiment.

A synchronous display process performed by the mobile telephone 200 according to the second embodiment will now be explained. FIG. 23 is an illustrative flowchart of a synchronous display performed by the mobile telephone 200 according to the second embodiment. The synchronous display unit 224 in the mobile telephone 200 obtains the frame number of the frame to be replayed from the replay processing unit 23 (S401).

The synchronous display unit 224 calculates the replay time for the frame based on the obtained frame number and the frame length (S402). The synchronous display unit 224 retrieves for a lyrics phrase having a display start time closest and corresponds to the search range from the current frame to the 1st frame (S403).

If no lyrics phrase is found to have a display start time closest and corresponds to the search range from the current frame to the 1st frame (NO at S404), the synchronous display unit 224 determines if the replay of the entire music data has been completed (S405). If the replay of the music data has been completed (YES at S405), the synchronous display unit 224 ends displaying the lyrics phrases (S406). On the contrary, if the replay of the music data has not been completed (NO at S405), the synchronous display unit 224 waits until the frame completes (S407), and then obtains the next frame number again (S401).

If a lyrics phrase is found to have a display start time closest and corresponds to the search range from the current frame to the 1st frame (YES at S404), the symbol detecting unit 226 included in the synchronous display unit 224 determines if the special symbol, indicating that a guitar chords is embedded in the phrase, is present (S408).

If the symbol detecting unit 226 determines that the special symbol is not present (NO at S408), the display controlling unit 227 included in the synchronous display unit 224 starts displaying the corresponding phrase (S409). The synchronous display unit 224 then performs the processes at Steps S405 to S407.

If the symbol detecting unit 226 determines that the special symbol is present (YES at S408), the display controlling unit 227 establishes a predetermined character counter and a lyrics counter, and gives the initial settings of zero to the character counter and the lyrics counter (S410).

According to the value set in the character counter, the display controlling unit 227 takes out a single character from a corresponding phrase (S411). More specifically, if the character counter is set to N, the display controlling unit 227 takes out the Nth character from the corresponding phrase. For example, if the character counter is set to "0", the display controlling unit 227 takes out the zero-th character from the corresponding phrase. At this time, it is assumed that the zero-th character in the phrase is at the head of the phrase.

The display controlling unit 227 then determines the type of the character that is taken out (S412). If the display controlling unit 227 determines that the type of the character is a character (OTHER THAN SYMBOL AND LINE FEED at S412), the display controlling unit 227 displays the single character that is taken out in the line for displaying the lyrics phrase in the lyrics phrase displaying area 65$h$ (S413). The display controlling unit 227 increments the character counter by one (S414), and increments the lyrics counter by one (S415). The display controlling unit 227 then returns to the process at Step S411.

If the type of the character is the special symbol (SPECIAL SYMBOL at S412), the display controlling unit 227 displays the character interposed between the special symbols at the position of a character indicated by the count in the lyrics counter, in the line for displaying the guitar chord in the lyrics phrase displaying area 65$h$ (S416). For example, if the lyrics counter is set to "3", the display controlling unit 227 displays the character interposed between the special symbols to the third position from the left in the line for displaying the guitar chord. The display controlling unit 227 then increments the character counter by "2" that is the number of characters of the special symbols, and by the number of characters corresponding to the guitar chords interposed between the special symbols (S417). The display controlling unit 227 then returns to the process at Step S411.

If the type of the character is a line feed (LINE FEED at S412), the display controlling unit 227 performs the processes at S405 to S407.

As described above, upon detecting the special symbol contained in the lyrics data, the mobile telephone 200 according to the second embodiment detects the character interposed between the special symbols as a guitar chord. The mobile telephone 200 then controls to display the lyrics and the guitar chords contained in the lyrics data into two different lines. Alternatively, the mobile telephone 200 may control to display the guitar chords above the lyrics in the same line.

In this manner, the mobile telephone 200 according to the second embodiment can display the lyrics as well as the guitar chords together with the replay of the music. As a result, because the mobile telephone 200 according to the second embodiment can provide a user with information other than lyrics, the convenience for the user can be improved. For example, the mobile telephone 200 according to the second embodiment enables a user to sing along as well as to play guitar while listening to the music, by looking at the lyrics and the guitar chords displayed on the display 41.

In the second embodiment, the music data is described as an example of the content data, and the lyrics data is described as an example of the associated information. Such data is given by way of example, and any contents whose output changes over time can be used as the content data. Similarly, any data whose displayed contents change along the replay of the content data may be used as the associated information data. Furthermore, the content data do not necessary have to accompany any sound output, and may be data only whose displayed contents change over time.

For example, the mobile telephone 200 may also display thereon piano chords, musical scales such as "do, re, mi, fa, sol, la, ti, do", or musical symbols, such as notes and rests, used in a musical score in synchronization with replay of the music. Furthermore, the mobile telephone 200 may also display thereon, together with the lyrics, symbols of parts representing who are to be singing the lyrics along with the replay of the music. Examples of the "symbols of parts" include, if music is a duet, duet marks such a spade mark indicating the male part, and a heart mark indicating the female part.

Furthermore, if a video such as a movie is replayed as the content data, the mobile telephone 200 may also display thereon information explaining the video that is being replayed together with subtitles. In this manner, a user can see information explaining the background of the video, or information on the people who are performing in the movie, for example, while reading the subtitles in the video being replayed. Furthermore, if a video such as a movie is replayed as the content data, the mobile telephone 200 may display thereon English subtitles together with Japanese subtitles. In this manner, because the user can read the Japanese and the English at the same time while the video is being replayed, the user can use the mobile telephone 200 for studying the language.

Furthermore, the mobile telephone 200 according to the second embodiment may be combined with the mobile telephone 1 according to the first embodiment. More specifically, the synchronous display unit 224 according to the second embodiment may include the display advancement operation detecting unit 26, the operated amount determining unit 27, and the display advancement controlling unit 28 illustrated in FIG. 1. The mobile telephone 200 then displays thereon the lyrics and the guitar chords other than those corresponding to the replayed portion, upon being requested to display the lyrics other than those corresponding to the replayed portion, while replaying the music data and the lyrics data synchronously.

[c] Third Embodiment

In the example disclosed in the first embodiment, a single line of the lyrics phrase contained in the lyrics data is displayed as a single line in the lyrics phrase displaying area 65. The portable information processing apparatus disclosed herein may also display a single line of the lyrics phrase by dividing the line into a plurality of lines, or display a single line of the lyrics phrase by dividing the line over different display time. In a third embodiment of the present invention, examples in which a single line of the lyrics phrase is divided into a plurality of lines, or a single line of the lyrics phrase is divided over different display time will be explained.

Figure 24:
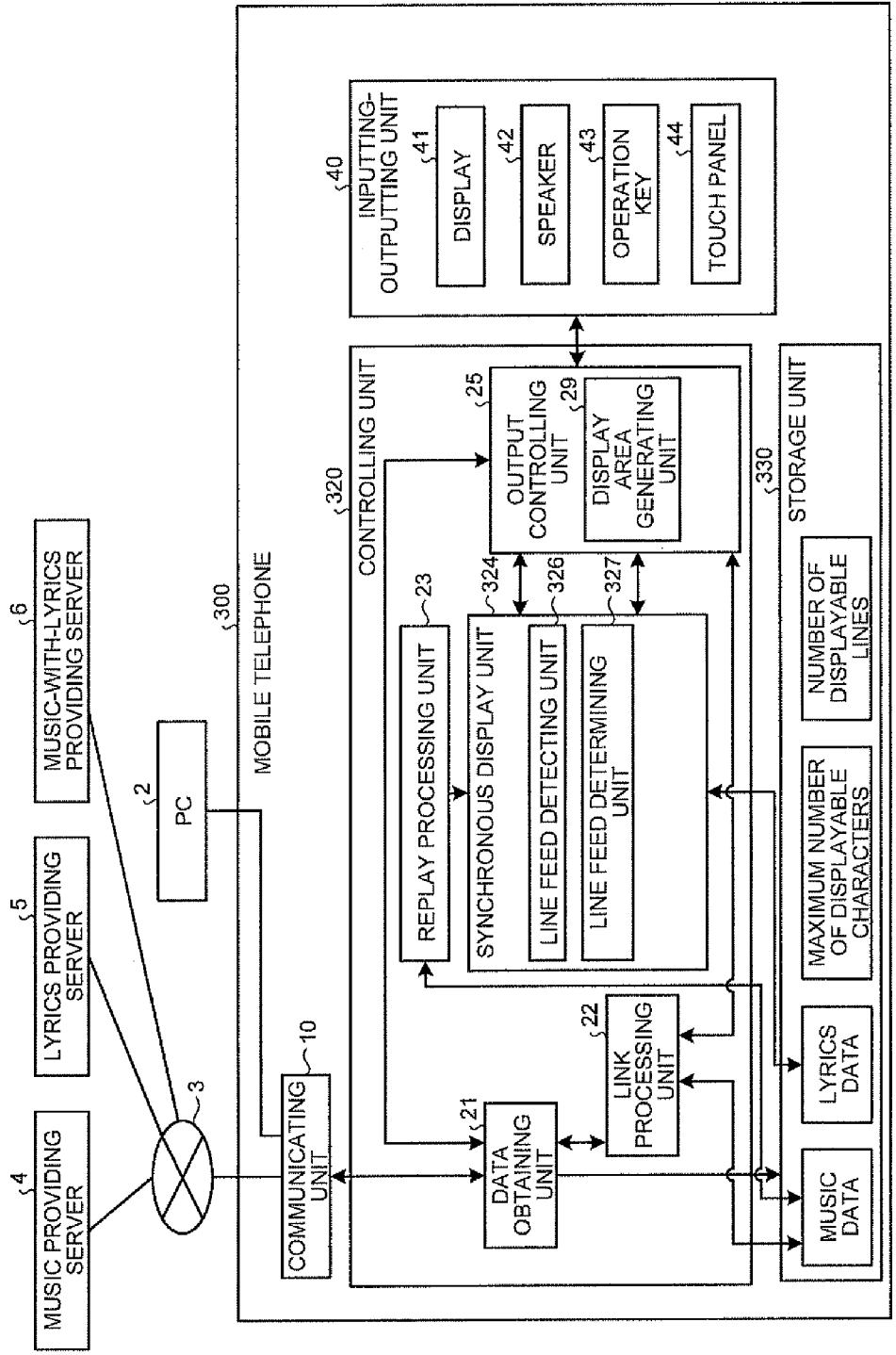
FIG. 24 is a schematic of a mobile telephone according to a third embodiment of the present invention.

FIG. 24 is a schematic of a configuration of a mobile telephone that is a portable information processing apparatus according to the third embodiment. A mobile telephone 300 illustrated in FIG. 24 includes therein the communicating unit 10, the inputting-outputting unit 40, a controlling unit 320, and a storage unit 330.

The storage unit 330 stores therein the music data, the lyrics data, the maximum number of displayable characters, and the number of displayable lines. Generally, a mobile telephone has a storage medium that a user can use for storing therein any data, such as image or telephone number data. In FIG. 24, the storage unit 330 in which a user can store any data is illustrated to store therein the music data, the lyrics data, the maximum number of the displayable characters, and the number of the displayable lines. A depiction of and an explanation about other data stored in the storage unit 330 are omitted herein.

The structures of the music data and the lyrics data are the same as the examples illustrated in FIG. 3. The maximum number of the displayable characters is the maximum number of characters that can be displayed in a single line in the lyrics phrase displaying area 65 whose example is illustrated in FIG. 5; and the number of the displayable lines is the number of lines that can be displayed in the lyrics phrase displaying area 65.

Figure 25:
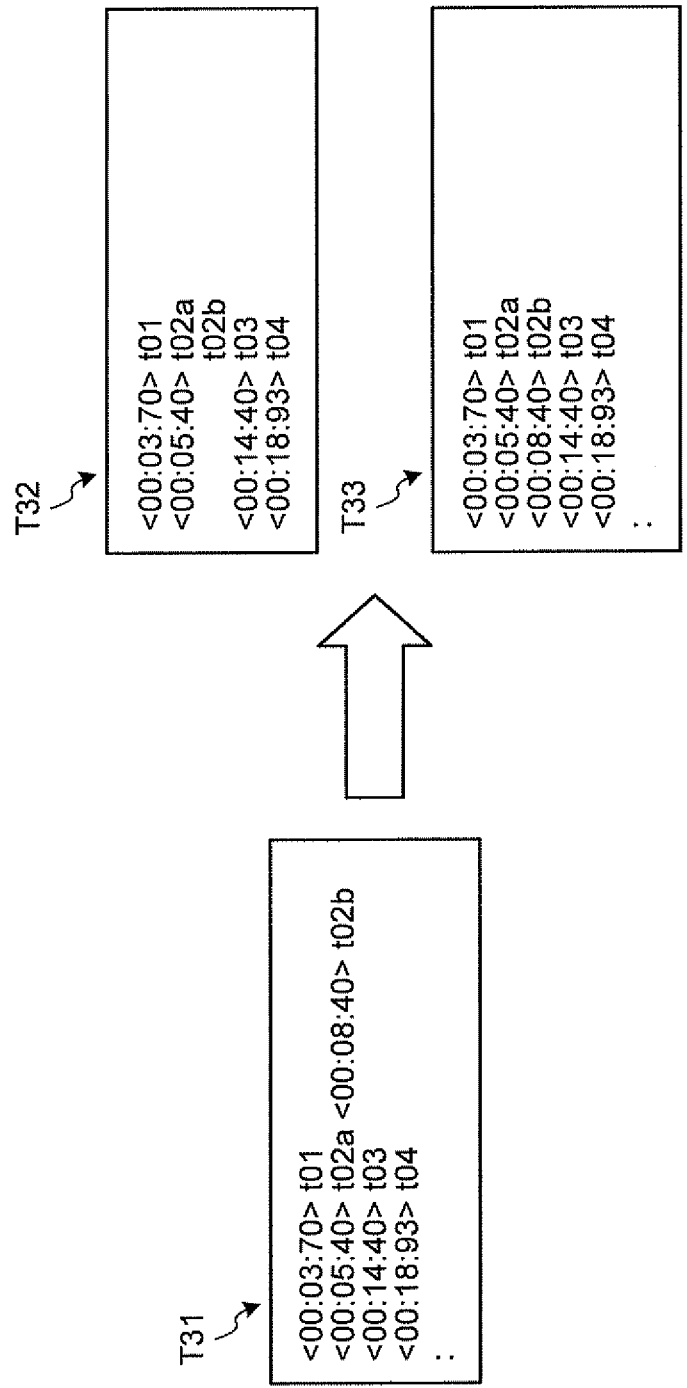
FIG. 25 is a schematic of an example of body data contained in lyrics data according to the third embodiment.

FIG. 25 is a schematic of an example of body data contained in lyrics data according to the third embodiment. If the display start time is present only at the head of the lyrics phrase, like the examples in the first, the third, and the fourth lines in body data T31 illustrated in FIG. 25, the display start time indicates the timing at which the corresponding lyrics phrase is to be displayed. For example, the first line in the body data illustrated in FIG. 25 indicates that the timing at which the lyrics phrase t01 is to be replayed is in three seconds after the music starts to be replayed.

If the display start time is present in the middle of a lyrics phrase like the second line in the body data T31 illustrated in FIG. 25, the display time in the middle indicates that the lyrics phrase is separated into predetermined segments. The display start time that is present in the middle of the lyrics phrase indicates that a line feed may be inserted in the middle of the lyrics phrase, or the lyrics phrase may be divided in and displayed at different display timing. A synchronous display unit 324 that is to be described later controls to insert the line feed or to display the lyrics phrase at different display timing. A process performed by the synchronous display unit 324 will be described later.

The controlling unit 320 is a controlling unit that controls the operation performed by the mobile telephone 300. The controlling unit 320 includes, as a function of a general mobile telephone, a function to connect to a mobile telephone network provided by a mobile telephone service provider to establish a call. An explanation about the calling function is omitted herein, and processing units related to the music data and the lyrics data handling will now be explained.

The controlling unit 320 includes therein the data obtaining unit 21, the link processing unit 22, the replay processing unit 23, the output controlling unit 25, and the synchronous display unit 324.

The synchronous display unit 324 is a processing unit that causes the lyrics data to be displayed in synchronization with the music data replayed by the replay processing unit 23. More specifically, the synchronous display unit 324 retrieves the storage unit 330 for corresponding lyrics data based on the music data identifying information received from the replay processing unit 23. The synchronous display unit 324 then sequentially causes a plurality of lyrics phrases contained in the lyrics data to be displayed in synchronization with the progress of the music data replayed by the replay processing unit 23. More specifically, a displaying operation performed by the synchronous display unit 324 is achieved by selecting the lyrics phrases to be displayed and instructing the output controlling unit 25 to display the lyrics phrases.

The synchronous display unit 324 includes therein a line feed detecting unit 326 and a line feed determining unit 327. The line feed detecting unit 326 detects if any display start time is found to be indicating that a line feed may be inserted into the lyrics in the middle of the lyrics phrase corresponding to the replayed portion in the music data.

If the line feed detecting unit 326 detects that the display start time is in the middle of the lyrics phrase, the line feed determining unit 327 reads the maximum number of the displayable characters from the storage unit 330. The line feed determining unit 327 then compares the read maximum number of the displayable characters with the number of the characters in the lyrics phrase to be displayed to determine that the lyrics phrase to be displayed can be displayed in a single line in the lyrics phrase displaying area 65. If the line feed determining unit 327 determines that the lyrics phrase can be displayed in a single line, the line feed determining unit 327 instructs the output controlling unit 25 to display the lyrics phrase in a single line.

On the contrary, if the line feed determining unit 327 determines that the lyrics phrase cannot be displayed in a single line, the line feed determining unit 327 reads the number of the displayable lines from the storage unit 330 to determine if the a plurality of lines can be displayed in the lyrics phrase displaying area 65. If the line feed determining unit 327 determines that the lines can be displayed, the line feed determining unit 327 instructs the output controlling unit 25 to insert a line feed every time a display start time appears in the lyrics phrase upon displaying the lyrics phrase. If the line feed determining unit 327 determines that only a single line can be displayed, the line feed determining unit 327 instructs the output controlling unit 25 to display the lyrics phrase at a display timing corresponding to the display start time.

An explanation will be further given using the example illustrated in FIG. 25. If the body data T31 of the lyrics data is like the one illustrated at the left side in FIG. 25, the line feed detecting unit 326 instructs the output controlling unit 25 to display a lyrics phrase t01 in three seconds after the music starts to be replayed. Because the display start time <00:08:40> is present in the middle of the lyrics phrase as illustrated in the second line of the body data T31, the line feed determining unit 327 reads the maximum number of the displayable characters from the storage unit 330. The line feed determining unit 327 then compares the read maximum number of the displayable characters with the numbers of the characters in lyrics phrases t02a and t02b to determine if the lyrics phrases t02a and t02b can be displayed in a single line.

At this time, if the maximum number of the displayable characters is equal to or more than the characters in the lyrics phrases t02a and t02b, the line feed determining unit 327 instructs the output controlling unit 25 to display the lyrics phrases t02a and t02b in a single line in five seconds after the music starts to be replayed. If the line feed determining unit 327 determines that the maximum number of the displayable characters is less than the number of the characters in the lyrics phrases t02a and t02b, the line feed determining unit 327 reads the number of the displayable lines from the storage unit 330 to determine if the lyrics phrases t02a and t02b can be displayed in a plurality of lines. If the line feed determining unit 327 determines that the lyrics phrases t02a and t02b can be displayed in the lines, the line feed determining unit 327 instructs the output controlling unit 25 to display the lyrics phrase t02a in the first line and the lyrics phrase t02b in the second line, respectively, in five seconds after the music starts to be replayed. On the contrary, if the line feed determining unit 327 determines that only a single line can be displayed, the line feed determining unit 327 instructs the output controlling unit 25 to display the lyrics phrase t02a in five seconds after the music starts to be replayed, and to display the lyrics phrase t02b in eight seconds after the music starts to be replayed. The line feed determining unit 327 then instructs the output controlling unit 25 to display a lyrics phrase t03 in fourteen seconds after the music starts to be replayed, and to display the lyrics phrase t04 in eighteen seconds after the music starts to be replayed.

The line feed detecting unit 326 and the line feed determining unit 327 may read the maximum number of the displayable characters and the number of the displayable lines from the storage unit 330 when the music starts to be replayed, to rewrite the body data T31 in the lyrics data. For example, in the example illustrated in FIG. 25, it is assumed that the line feed determining unit 327 determines that the maximum number of the displayable characters is less than the number of characters in the lyrics phrases t02a and t02b, and the lyrics phrases can be displayed in a plurality of lines. In such a scenario, the line feed determining unit 327 may rewrite the body data T31 with body data T32 as illustrated at the upper right in FIG. 25. For example, it is assumed that the line feed determining unit 327 determines that the maximum number of the displayable characters is less than the number of characters in the lyrics phrases t02a and t02b, and the lyrics phrases can be displayed only in a single line. In such a scenario, the line feed determining unit 327 may rewrite the body data T31 with body data T33 as illustrated in the lower right in FIG. 25. If the lyrics body data T31 read from the storage unit 330 is temporarily stored in a buffer, the line feed detecting unit 326 and the line feed determining unit 327 may rewrite the body data T31 stored in the buffer with the body data T32 or T33 in the same manner as explained above using the example.

The hardware configuration of the mobile telephone 300 is the same as that of the mobile telephone 1 illustrated in FIG. 2.

Figure 26:
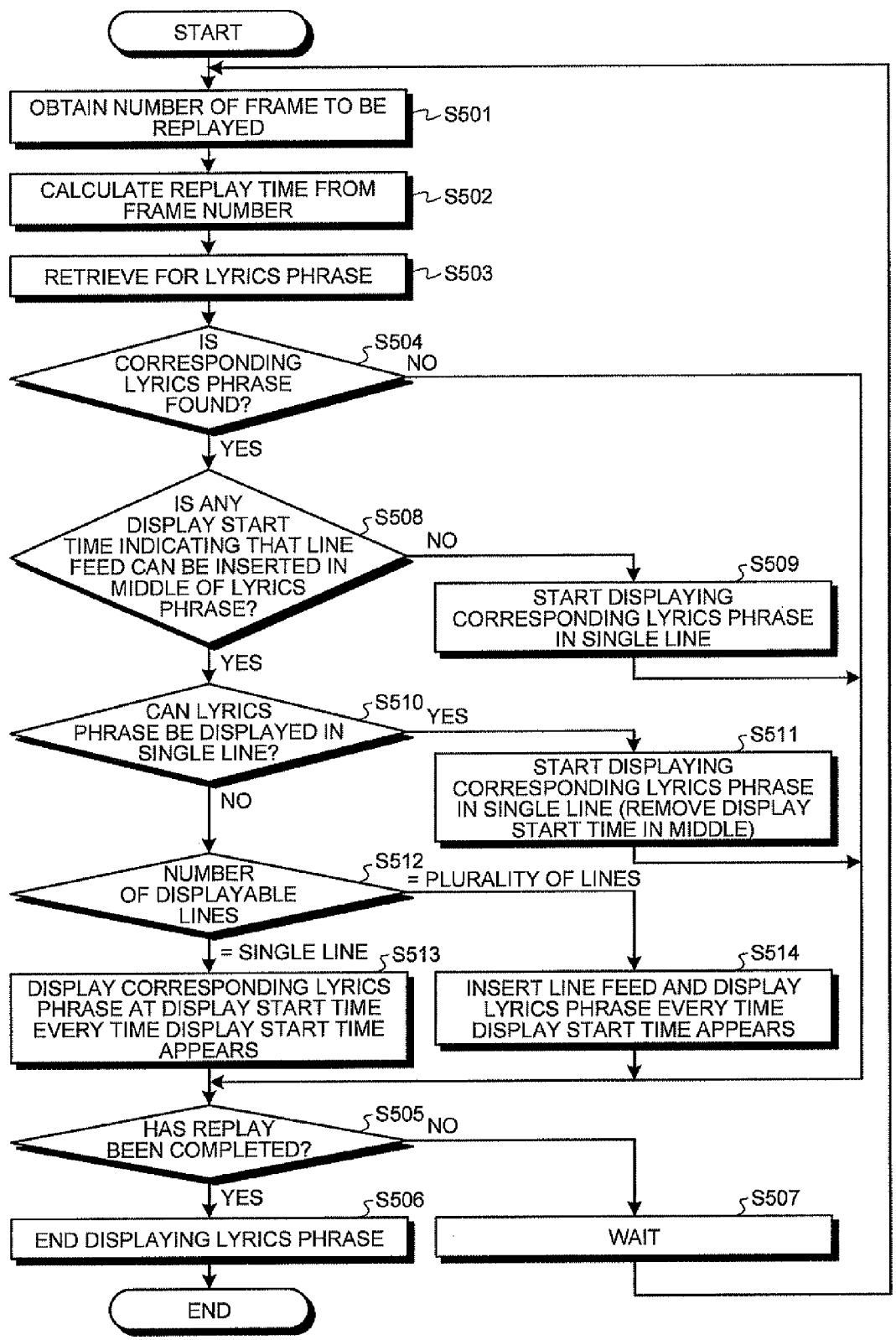
FIG. 26 is a flowchart of a synchronous display process performed by the mobile telephone according to the third embodiment.

A synchronous display process performed by the mobile telephone 300 according to the third embodiment will now be explained. FIG. 26 is an illustrative flowchart of the synchronous display performed by the mobile telephone 300 according to the third embodiment. The synchronous display unit 324 in the mobile telephone 300 obtains the frame number of the frame to be replayed from the replay processing unit 23 (S501).

The synchronous display unit 324 calculates the replay time for the frame based on the obtained frame number and the frame length (S502). The synchronous display unit 324 retrieves for a lyrics phrase having a display start time closest and corresponds to the search range from the current frame to the 1st frame (S503).

If no lyrics phrase is found to have a display start time closest and corresponds to the search range from the current frame to the 1st frame (NO at S504), the synchronous display unit 324 determines if the replay of the entire music data has been completed (S505). If the replay of the music data has been completed (YES at S505), the synchronous display unit 324 ends displaying the lyrics phrases (S506). On the contrary, if the replay of the music data has not been completed (NO at S505), the synchronous display unit 324 waits until the frame completes (S507), and then obtains the next frame number again (S501).

If any lyrics phrase is found to have a display start time closest and corresponds to the search range from the current frame to the 1st frame (YES at S504), the line feed detecting unit 326 detects if any display start time indicating the separation of the lyrics is found in the middle of the lyrics phrase (S508).

If the line feed detecting unit 326 does no detect any display start time in the middle of the lyrics phrase (NO at S508), the line feed determining unit 327 instructs the output controlling unit 25 to display the lyrics phrase in a single line (S509). The synchronous display unit 324 then performs the processes at Steps S505 to S507.

On the contrary, if a display start time is detected in the middle of the lyrics phrase (YES at S508), the line feed determining unit 327 reads the maximum number of the displayable characters from the storage unit 330, and determines if the lyrics phrase can be displayed in a single line in the lyrics phrase displaying area 65 (S510). If it is determined that the lyrics phrase can be displayed in a single line (YES at S510), the line feed determining unit 327 instructs the output controlling unit 25 to display the lyrics phrase in a single line (S511). At this time, the line feed determining unit 327 may instructs the output controlling unit 25 not to display the display start time included in the middle of the lyrics phrase. The synchronous display unit 324 then performs the processes at Steps S505 to S507.

On the contrary, if it is determined that the lyrics phrase cannot be displayed in a single line (NO at S510), the line feed determining unit 327 reads the number of the displayable lines from the storage unit 330 to determine if the lyrics phrase can be displayed in a plurality of lines (S512). If it is determined that the lyrics phrase can only be displayed in a single line (SINGLE LINE at S512), the line feed determining unit 327 instructs the output controlling unit 25 to display the lyrics phrase corresponding to the display start time every time the display start time appears in the lyrics phrase (S513). The synchronous display unit 324 then performs the processes at Steps S505 to S507.

On the contrary, if it is determined that the lyrics phrase can be displayed in the lines (PLURAL LINES at S512), the line feed determining unit 327 instructs the output controlling unit 25 to display the lyrics phrase inserting a line feed thereto every time the display start time appears in the lyrics phrase (S514). The synchronous display unit 324 then performs the processes at Steps S505 to S507.

As described above, when a plurality of display times is included in a lyrics phrase, upon displaying the lyrics phrase, the mobile telephone 300 according to the third embodiment inserts a line feed to the lyrics phrase, or divides the lyrics phrase in each of the display times based on the maximum number of the displayable characters and the number of the displayable lines.

In this manner, when the lyrics phrase is separated into given segments by way of the display time, the mobile telephone 300 according to the third embodiment can display thereon the lyrics by inserting a line feed or dividing the lyrics based on the segments thereof. As a result, the mobile telephone 300 according to the third embodiment can display the lyrics without losing the original meaning thereof, even if a single lyrics phrase has too many characters to be displayed in a single line.

Furthermore, the mobile telephone 300 according to the third embodiment determines if the lyrics phrase should be displayed in a single line or in a plurality of lines, or be divided in each of the display times based on the maximum number of the displayable characters and the number of the displayable lines. As a result, the mobile telephone 300 according to the third embodiment can display thereon the lyrics in a manner suitable for specifications of the display 41.

Furthermore, in the body data of the lyrics data according to the third embodiment, a display time, not another symbol, is used as a symbol indicating a separator in the lyrics. Therefore, the mobile telephone 300 according to the third embodiment can display thereon lyrics in a plurality of lines, or lyrics divided at each of the display times, without an additional process for analyzing another symbol representing a separator in the lyrics.

The mobile telephone 300 according to the third embodiment may be combined with the mobile telephone 1 according to the first embodiment. More specifically, the synchronous display unit 324 according to the third embodiment may also include the display advancement operation detecting unit 26, the operated amount determining unit 27, and the display advancement controlling unit 28 illustrated in FIG. 1. Upon being requested to display lyrics for portions other than the one being replayed while the music data and the lyrics data are replayed synchronously, the mobile telephone 300 displays thereon the lyrics for the portions other than the one being replayed in a plurality of lines by inserting a line feed, or dividing the lyrics in each of the display times.

Furthermore, the mobile telephone 300 according to the third embodiment may be combined with the mobile telephone 1 according to the first embodiment and the mobile telephone 200 according to the second embodiment. More specifically, the synchronous display unit 324 according to the third embodiment may include the display advancement operation detecting unit 26, the operated amount determining unit 27, the display advancement controlling unit 28, and the symbol detecting unit 226 and the display controlling unit 227 illustrated in FIG. 18. Upon being requested to display lyrics for portions other than the one being replayed while replaying the music data and the lyrics data synchronously, the mobile telephone 300 displays thereon the associated information such as the lyrics or the guitar chords for the portions other than the one being replayed in a plurality of lines by inserting a line feed, or dividing the lyrics at each of the display times.

[d] Fourth Embodiment

In the example disclosed in the first embodiment, the lyrics are displayed along the replay of the music. The portable information processing apparatus disclosed herein may also allow a user to adjust the timing at which the lyrics are displayed. Thus, in the example explained in a fourth embodiment of the present invention, the lyrics are displayed at the timing specified by a user.

Figure 27:
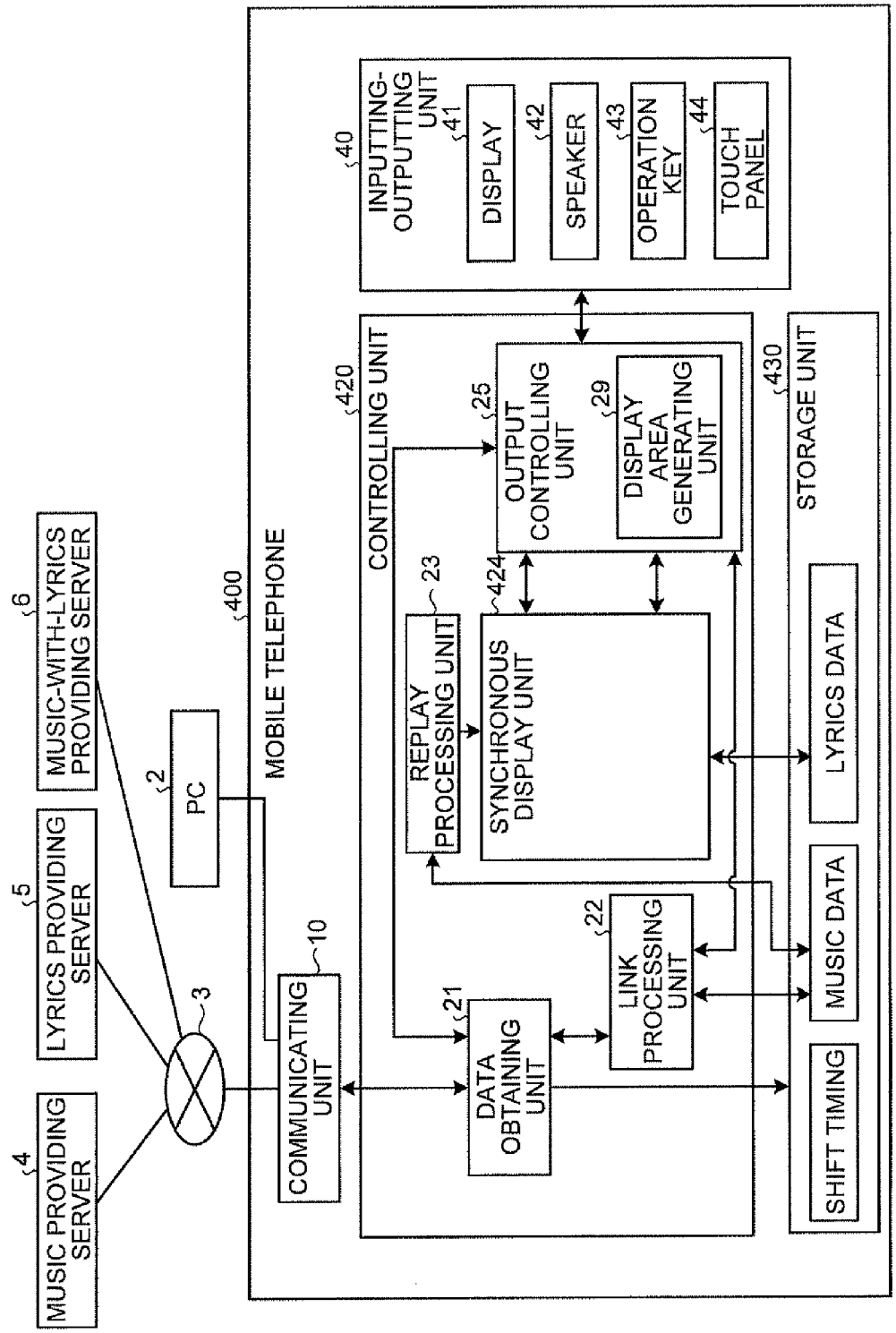
FIG. 27 is a schematic of a mobile telephone according to a fourth embodiment of the present invention.

FIG. 27 is a schematic of a configuration of a mobile telephone that is a portable information processing apparatus according to the fourth embodiment. A mobile telephone 400 illustrated in FIG. 27 includes therein the communicating unit 10, the inputting-outputting unit 40, a controlling unit 420, and a storage unit 430.

The storage unit 430 stores therein the music data, the lyrics data, and shift timing. Generally, a mobile telephone has a storage medium that a user can use for storing therein any data, such as image or telephone number data. In FIG. 27, the storage unit 430 in which a user can store any data is illustrated to store therein the music data, the lyrics data, and the shift timing. A depiction of and an explanation about other data stored in the storage unit 430 are omitted herein.

The structures of the music data and the lyrics data are the same as the examples illustrated in FIG. 3. The shift timing stores therein "0" as a default value, and when the user specifies a given value, stores therein the specified value.

The controlling unit 420 is a controlling unit that controls the operation of the mobile telephone 400. The controlling unit 420 includes, as a function of a general mobile telephone, a function to connect to a mobile telephone network provided by a mobile telephone service provider to establish a call. An explanation about the calling function is omitted herein, and processing units related to the music data and the lyrics data handling will now be explained.

The controlling unit 420 includes therein the data obtaining unit 21, the link processing unit 22, the replay processing unit 23, the output controlling unit 25, and a synchronous display unit 424.

The synchronous display unit 424 is a processing unit that causes the lyrics data to be displayed in synchronization with the music data replayed by the replay processing unit 23. More specifically, the synchronous display unit 424 retrieves the storage unit 430 for the corresponding lyrics data based on the music data identifying information received from the replay processing unit 23. If the corresponding lyrics data is found, the synchronous display unit 424 reads the retrieved lyrics data. The synchronous display unit 424 then determines if a value other than zero is set in the shift timing. If a value other than zero is set in the shift timing, the synchronous display unit 424 increments or decrements all of the display start times contained in the read lyrics data by the time specified in the shift timing. In this manner, the synchronous display unit 424 sequentially causes a plurality of lyrics phrases contained in the lyrics data to be displayed in synchronization with the progress of the music data replayed by the replay processing unit 23. More specifically, a displaying operation performed by the synchronous display unit 424 is achieved by selecting the lyrics phrases to be displayed and instructing the output controlling unit 25 to display the lyrics phrases.

The hardware configuration of the mobile telephone 400 is the same as that of the mobile telephone 1 illustrated in FIG. 2.

Figure 28:
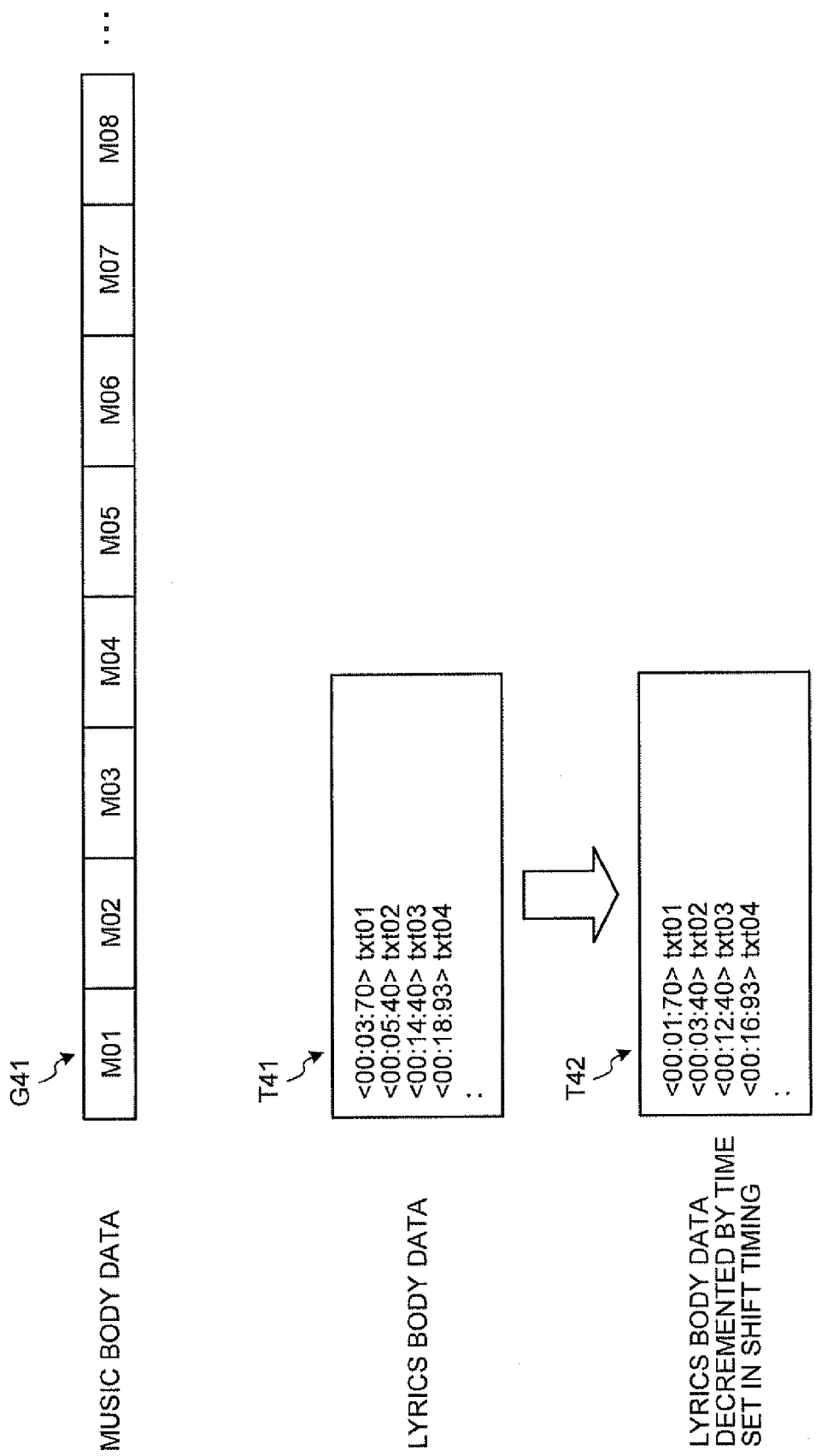
FIG. 28 is a schematic for explaining a synchronous display of the lyrics data with replay of the music data.

FIG. 28 is an illustrative schematic of a synchronous display of the lyrics data with replay of the music data. In the example illustrated in FIG. 28, music body data G41 includes a plurality of frames, each having the length of one second. Each of these frames is also assigned with a replay order. In other words, each of the frames included in the music data is a piece of music segmented into the length of one second, and assigned with a frame number representing the order in which the frame is replayed. Upon starting replaying the music, a frame M01 is output. The output of the frame M01 is completed in one second. Subsequently, a frame M02, a frame M03, and following frames are sequentially output. The replay of the music is completed when the output of the last frame is completed.

In the example illustrated in FIG. 28, the lyrics body data T41 includes a plurality of the lyrics phrases and the display start time for each of the lyrics phrases. The display start time functions as information that indicates timing at which each of the lyrics phrases is displayed. Each of the lyrics phrases is displayed for a period starting at the display start time of this lyrics phrase and ending at the display start time of the next lyrics phrase. At this time, if a value other than zero is specified in the shift timing in the storage unit 430, the synchronous display unit 424 increments or decrements the display start time by the time specified in the shift timing. As a result, each of the lyrics phrases is displayed for a period starting at the incremented or decremented display start time thereof and ending at the incremented or decremented display start time of the next lyrics phrase.

For example, in the example illustrated in FIG. 28, if zero is set to the shift timing, the lyrics phrase txt01 starts to be displayed in three seconds after the music starts to be replayed. The lyrics phrase txt01 is then rewritten by the lyrics phrase txt02 in five seconds after the music starts to be replayed. The lyrics phrase txt02 is then rewritten by the lyrics phrase txt03 in fourteen seconds after the music starts to be replayed, and the lyrics phrase txt03 is rewritten by the lyrics phrase txt04 in nineteen seconds after the music starts to be replayed.

In the example illustrated in FIG. 28, if "−00:02:00" is specified in the shift timing, the synchronous display unit 424 rewrites the body data T41 with body data T42. The lyrics phrase txt01 then starts to be displayed in one second after the music starts to be replayed. The lyrics phrase txt01 is then rewritten by the lyrics phrase txt02 in three seconds after the music starts to be replayed. The lyrics phrase txt02 is then rewritten by the lyrics phrase txt03 in twelve seconds after the music starts to be replayed, and the lyrics phrase txt03 is rewritten by the lyrics phrase txt04 in sixteen seconds after the music starts to be replayed.

The display of the lyrics phrase is ended synchronously with the end of the replay of the music. The content of a lyrics phrase can be kept blank to realize a period in which no lyrics are displayed.

If the lyrics body data T41 read from the storage unit 430 is temporarily stored in a buffer, the synchronous display unit 424 may rewrite the body data T41 stored in the buffer with the body data T42 in the same manner as explained above using the example.

Figure 29:
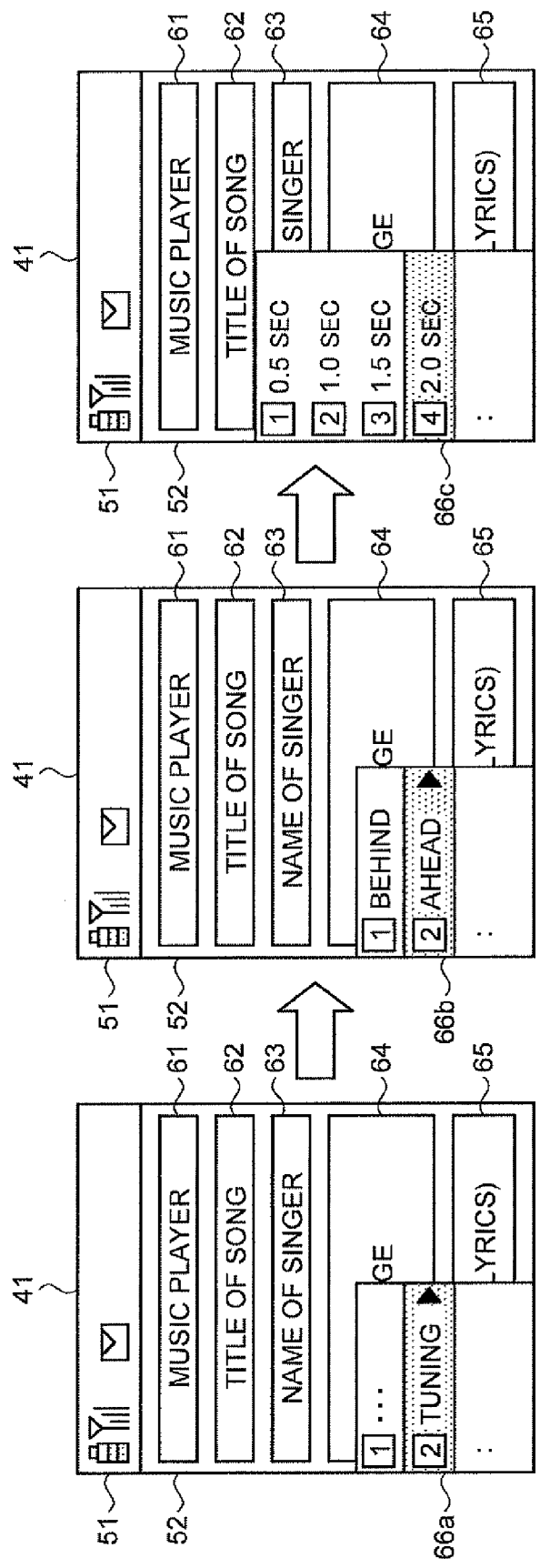
FIG. 29 is a schematic of an example of a user interface for setting the time of shift timing.

FIG. 29 is a schematic of an example of a user interface for specifying the time for the shift timing. In the example illustrated in FIG. 29, the user can specify the shift timing in units of 0.5 seconds. Using the example illustrated in FIG. 29, an exemplary way of specifying the shift timing will now be explained. As illustrated in the example at the left side in FIG. 29, if the user makes an operation to select "TUNING" from a predetermined menu list 66a, the mobile telephone 400 displays thereon a selecting menu for allowing the user to shift the timing at which the lyrics phrase is displayed ahead or behind. For example, as illustrated in the example at the center in FIG. 29, the mobile telephone 400 displays thereon a selecting menu 66b from which "BEHIND" and "AHEAD" can be selected. If the user select either "BEHIND" or "AHEAD", the mobile telephone 400 displays thereon a shift timing selecting menu 66c for allowing the time to be selected, like the example illustrated at the right side in FIG. 29. The mobile telephone 400 then sets the time selected on the shift timing selecting menu 66c to the shift timing stored in the storage unit 430.

For example, in the example illustrated in FIG. 29, it is assumed that the user selects "AHEAD" on the selecting menu 66b, and then selects "2.0 seconds" on the shift timing selecting menu 66c. In such a scenario, the mobile telephone 400, for example, sets "−00:02:00" to the shift timing stored in the storage unit 430. For example, it is assumed that the user selects "BEHIND" on the selecting menu 66b, and then selects "1.5 seconds" on the shift timing selecting menu 66c. In such a scenario, the mobile telephone 400, for example, sets "+00:01:50" to the shift timing stored in the storage unit 430.

Figure 30:
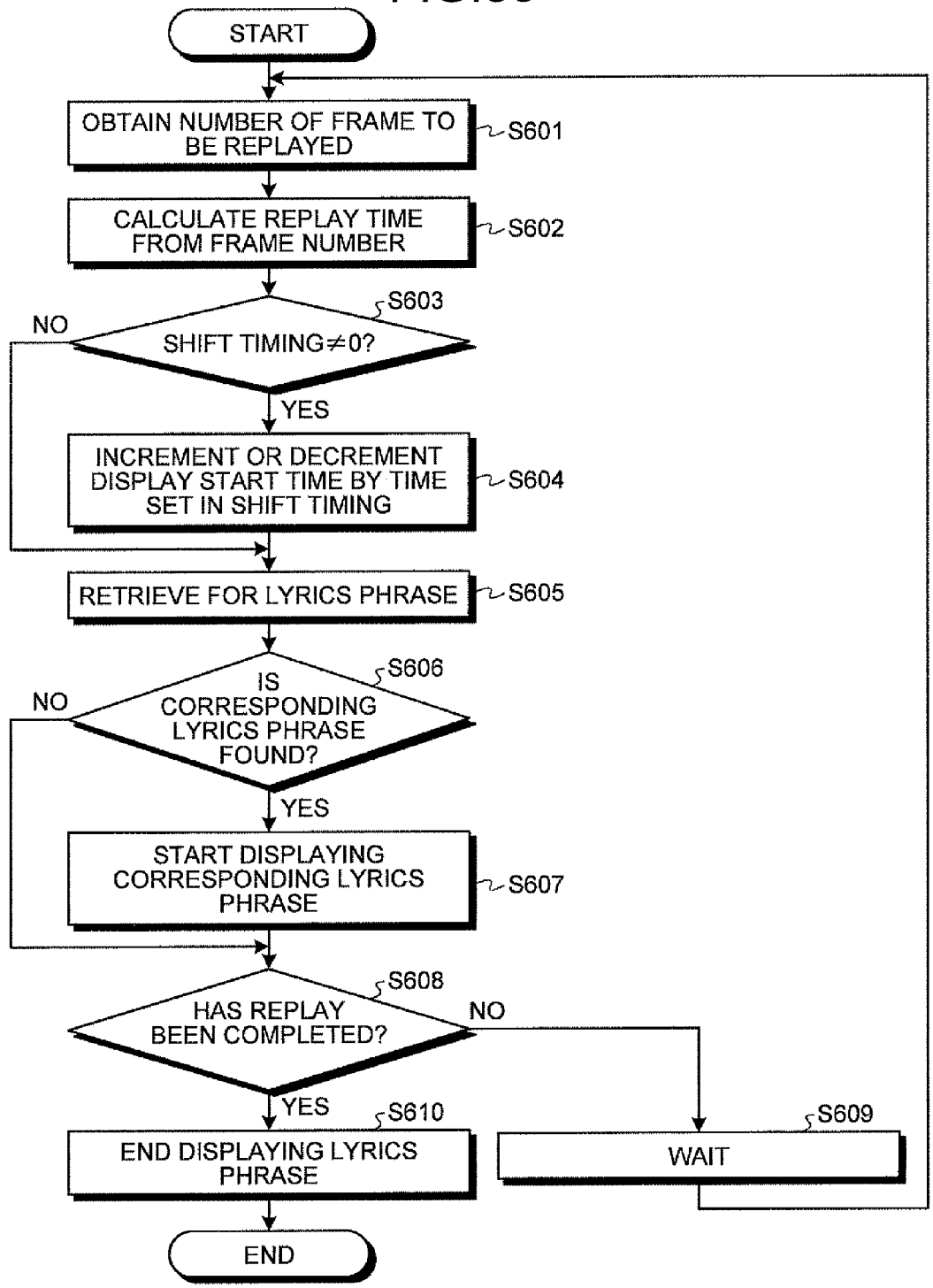
FIG. 30 is a flowchart of a synchronous display process performed by the mobile telephone according to the fourth embodiment.

A synchronous display process performed by the mobile telephone 400 according to the fourth embodiment will now be explained. FIG. 30 is an illustrative flowchart of the synchronous display process performed by the mobile telephone 400 according to the fourth embodiment. The synchronous display unit 424 in the mobile telephone 400 obtains the frame number of the frame to be replayed from the replay processing unit 23 (S601).

The synchronous display unit 424 calculates the replay time for the frame based on the obtained frame number and the frame length (S602). The synchronous display unit 424 then determines if any value other than zero is specified in the shift timing (S603).

If a value other than zero is specified in the shift timing (YES at S603), the synchronous display unit 424 increments or decrements all of the display start times contained in the read lyrics data by the time specified in the shift timing (S604). The synchronous display unit 424 then retrieves for a lyrics phrase having a display start time closest and corresponds to the search range from the current frame to the 1st frame (S605). On the contrary, if zero is specified in the shift timing (NO at S603), the synchronous display unit 424 retrieves for a lyrics phrase having a display start time closest and corresponds to the search range from the current frame to the 1st frame, without performing the process at Step S604 (S605).

If any lyrics phrase is found to have a display start time closest and corresponds to the search range from the current frame to the 1st frame (YES at S606), the synchronous display unit 424 starts displaying the lyrics phrase (S607). If a prior lyrics phrase is being displayed upon starting displaying the lyrics phrase, the synchronous display unit 424 deletes and updates the prior lyrics phrase that is being displayed. The synchronous display unit 424 then determines if the replay of the entire music data has been completed (S608).

If no lyrics phrase is found to have a display start time closest and corresponds to the search range from the current frame to the 1st frame (NO at S606), the synchronous display unit 424 determines if the replay of the entire music data has been completed (S608).

If the replay of the music data has not been completed (NO at S608), the synchronous display unit 424 waits until the frame completes (S609), and then obtains the next frame number again (S601). If the replay of the music data has been completed (YES at S608), the synchronous display unit 424 ends displaying the lyrics phrases (S610).

Figure 31:
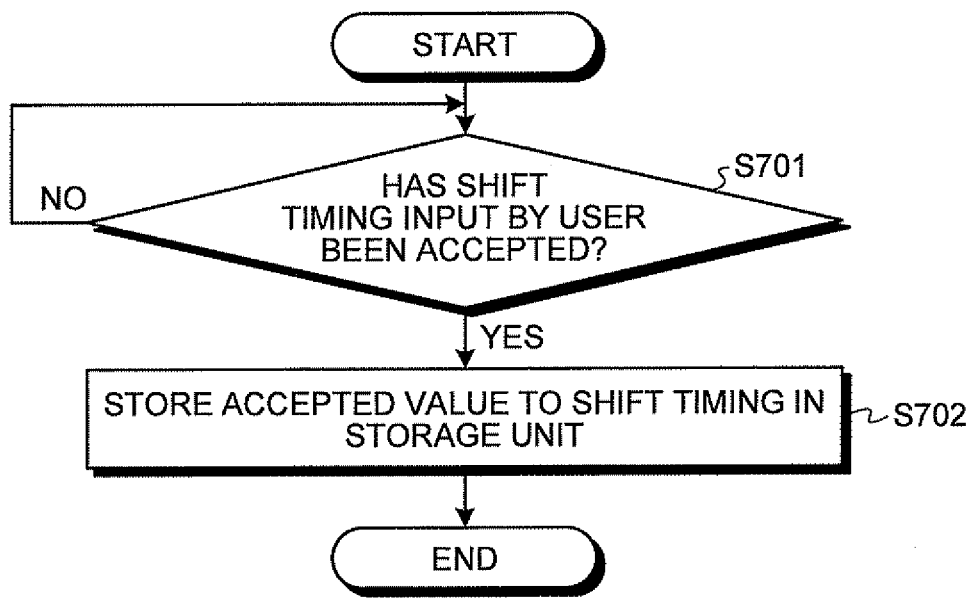
FIG. 31 is a flowchart of a shift timing updating process.

FIG. 31 is an illustrative flowchart of a shift timing updating process. If an input of the shift timing is received from the user (YES at S701), the mobile telephone 400 stores the accepted value in the shift timing stored in the storage unit 430 (S702).

The shift timing updating process illustrated in FIG. 31 is performed while the music is being replayed. Furthermore, as illustrated in FIG. 30, every time a frame number to be replayed is obtained, the synchronous display unit 424 reads the shift timing from the storage unit 430 and adjusts the display start time of the lyrics phrase. In other words, every time the frame number to be replayed is obtained, the synchronous display unit 424 can adjust the display start time for displaying the lyrics phrase using the shift timing updated during the time the music is being replayed.

As described above, upon replaying a piece of music, the mobile telephone 400 according to the fourth embodiment adjusts the timing for displaying the lyrics phrase by the time specified in the shift timing. In this manner, the mobile telephone 400 according to the fourth embodiment can shift the time for displaying the lyrics corresponding to the time the music data is replayed by the time specified by the user. As a result, the mobile telephone 400 according to the fourth embodiment can display thereon the lyrics at a timing that the user desires, for each piece of music.

For example, even if the music is the same, a period in which no sound is included at the head of the music data may differ depending on the music providing server 4 that provides the music. Furthermore, even if the music is the same, the period in which no sound is included at the head of the music data may also differ between the music data generated from a CD and those provided by a download site. In such situations, the replay of the music may not be synchronized with the display of the lyrics, even if the lyrics are sequentially displayed along the music being replayed. If the mobile telephone 400 according to the fourth embodiment is used, because the user can adjust the timing at which the lyrics are displayed while the music is being displayed, the replay of the music can be synchronized with the display of the lyrics.

Furthermore, a user may wish to have the lyrics to be displayed at different timing. For example, a user A may wish to have the lyrics displayed in synchronization with the replay of the music; and a user B may wish to have the lyrics to be displayed ahead of time before the replay of the music. If the mobile telephone 400 according to the fourth embodiment is used, these users can adjust the timing the lyrics are displayed during the time the music is being replayed, and the users can have the lyrics displayed at the timing the users themselves wish.

In the example described in the fourth embodiment, when a value other than zero is specified to the shift timing, all of the display start times included in the lyrics data are incremented or decremented by the time specified in the shift timing; however, the mobile telephone 400 may also increment or decrement the display start time of the lyrics phrase to be displayed only by the time specified in the shift timing.

Furthermore, the mobile telephone 400 according to the fourth embodiment may be combined with the mobile telephone 1 according to the first embodiment. More specifically, the synchronous display unit 424 according to the fourth embodiment may also include the display advancement operation detecting unit 26, the operated amount determining unit 27, and the display advancement controlling unit 28 illustrated in FIG. 1. Upon being requested to display lyrics for portions other than the one being replayed while replaying the music data and the lyrics data synchronously, the mobile telephone 400 adjusts the timing to display the lyrics corresponding to the portion other than the one being replayed by the time specified in the shift timing.

Furthermore, the mobile telephone 400 according to the fourth embodiment may be combined with the mobile telephone 1 according to the first embodiment and the mobile telephone 200 according to the second embodiment. More specifically, the synchronous display unit 424 according to the fourth embodiment may include the display advancement operation detecting unit 26, the operated amount determining unit 27, the display advancement controlling unit 28, and the symbol detecting unit 226 and the display controlling unit 227 illustrated in FIG. 18. Upon being requested to display lyrics for portions other than the one being replayed while replaying the music data and the lyrics data synchronously, the mobile telephone 400 adjusts the timing for displaying the associated information such as the lyrics or the guitar chords for the portions other than the one being replayed by the time specified in the shift timing.

Furthermore, the mobile telephone 400 according to the fourth embodiment may be combined with the mobile telephones 1, 200, and 300 according to the first, the second, and the third embodiments. More specifically, the synchronous display unit 424 according to the fourth embodiment may include the display advancement operation detecting unit 26, the operated amount determining unit 27, and the display advancement controlling unit 28, the symbol detecting unit 226 and the display controlling unit 227, and the line feed detecting unit 326 and the line feed determining unit 327 illustrated in FIG. 24. Upon being requested to display lyrics for portions other than the one being replayed while replaying the music data and the lyrics data synchronously, the mobile telephone 400 adjusts the timing for displaying the associated information such as the lyrics or the guitar chords for the portions other than the one being replayed by the time specified in the shift timing. The mobile telephone 400 then displays thereon the lyrics in a plurality of lines, or dividing the lyrics at each of the display times.

Through the portable information processing apparatus, the content replaying method, and the content replaying program disclosed herein according to the embodiment, it is possible to provide a portable information processing apparatus, a content replaying method, and a content replaying program that enable associated information other than the one corresponding to a replayed portion to be displayed efficiently on a small-sized display, and that improve the operability for synchronous replay of content data and associated data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable information processing apparatus comprising:
a replay processing unit that replays content data; a synchronous display unit that selects a piece of associated information corresponding to a replayed portion of the content data from a plurality of pieces of associated information contained in associated data corresponding to the content data, and instructs to display the associated information thus selected; and an output controlling unit that displays the associated information that is selected by the synchronous display unit in an associated information display area arranged in a display unit, wherein upon accepting an operation requesting to display associated information other than the one corresponding to the replayed portion of the content data out of the pieces of the associated information contained in the associated data corresponding to the content data, the synchronous display unit selects the associated information other than the one corresponding to the replayed portion based on the operation and instructs the output controlling unit to display the information, and the replay processing unit continues, as asynchronous display, the replay of the replayed portion of the content data independently of the display of associated data, even if the associated data other than associated data corresponding to the replayed portion of the content data is displayed, wherein when a predetermined time elapses after the associated information other than the one corresponding to the replayed portion is selected, the synchronous display unit ends selecting the associated information other than the one corresponding to the replayed portion and the output controlling unit automatically switches displayed associated information, after the predetermined time has elapsed when subsequent associated information or replayed associated information is displayed, from the associated information to associated information corresponding to the replayed portion of the content data of time after the predetermined time has elapsed, and wherein the content data is audio data.

2. The portable information processing apparatus according to claim 1, wherein the synchronous display unit performs, based on the operation, either a fast-forward display in which the associated information is selected in a direction corresponding to the progress of the replay using the replayed portion of the content data as a point of origin, or a fast-rewind display in which the associated information is selected in a reverse direction with respect to the progress of the replay using the replayed portion of the content data as a point of origin.

3. The portable information processing apparatus according to claim 2, wherein the synchronous display unit determines an amount of display advancement from a piece of the associated information corresponding to the replayed portion of the content data to a selected piece of the associated information based on an operated amount of the operation.

4. The portable information processing apparatus according to claim 3, wherein the operated amount is time for which an operation unit is operated.

5. The portable information processing apparatus according to claim 3, wherein the operated amount is a distance from a contact starting point to a contact ending point on a touch panel.

6. The portable information processing apparatus according to claim 1, wherein, upon accepting the operation again before ending selecting the associated information other than the one corresponding to the replayed portion, the synchronous display unit selects another piece of associated information, using the associated information currently selected as a point of origin.

7. The portable information processing apparatus according to claim 1, wherein the synchronous display unit selects the associated information corresponding to the replayed portion of the content data and the associated information other than the one corresponding to the replayed portion simultaneously instructs the output controlling unit to display both information.

8. The portable information processing apparatus according to claim 1, wherein, upon being instructed to display the associated information other than the one corresponding to the replayed portion, the output controlling unit enlarges the associated information display area.

9. The portable information processing apparatus according to claim 1, further comprising:
an accepting unit that accepts a shift timing that is a time for shifting timing at which the associated information is displayed ahead or behind, wherein
the synchronous display unit adjusts a display start time of the associated information by the shift timing accepted by the accepting unit and instructs the output controlling unit to display the associated information.

10. The portable information processing apparatus according to claim 1, wherein
the pieces of associated information include a first piece of information, a second piece of information, and positioning information on positions where the first piece of information and the second piece of information are displayed in the associated information display area, and
the synchronous display unit instructs the output controlling unit to display the first piece of information and the second piece of information according to the positioning information.

11. The portable information processing apparatus according to claim 1, wherein
the content data is a piece of music or a video, and
the associated information is lyrics of the music, chord names representing chord sounds of the music, musical scales of the music, musical symbols used in a score of the music, symbols representing who are to sing parts in the music, subtitles for the video, or information explaining the video.

12. A method for replaying content data, the method comprising:
replaying the content data; selecting a piece of associated information corresponding to a replayed portion of the content data from a plurality of pieces of associated information contained in associated data corresponding to the content data, and instructs to display the associated information thus selected; controlling output to display the associated information selected at the selecting in an associated information display area arranged on a display unit; accepting an operation requesting to display associated information other than the one corresponding to the replayed portion of the content data out of the pieces of the associated information contained in the associated data corresponding to the content data; and selecting the associated information other than the one corresponding to the replayed portion based on the operation and instructing the output controlling unit to display the information, and
the replaying includes continuing, as asynchronous display, the replay of the replayed portion of the content data independently of the display of associated data, even if the associated data other than associated data corresponding to the replayed portion of the content data is displayed, wherein the selecting includes ending, when a predetermined time elapses after the associated information other than the one corresponding to the replayed portion is selected, selecting the associated information other than the one corresponding to the replayed portion, the controlling includes automatically switching displayed associated information, after the predetermined time has elapsed when subsequent associated information or replayed associated information is displayed, from the associated information to associated information corresponding to the replayed portion of the content data of time after the predetermined time has elapsed, and
wherein the content data is audio data.

13. A non-transitory computer readable storage medium having stored therein a program for replaying content data, the program causing a portable information processing apparatus to execute a process comprising: replaying the content data; selecting a piece of associated information corresponding to a replayed portion of the content data from a plurality of pieces of associated information contained in associated data corresponding to the content data, and instructs to display the associated information thus selected; controlling output to display the associated information selected at the selecting in an associated information display area arranged on a display unit; accepting an operation requesting to display associated information other than the one corresponding to the replayed portion of the content data out of the pieces of the associated information contained in the associated data corresponding to the content data; and selecting the associated information other than the one corresponding to the replayed portion based on the operation and instructing the output controlling unit to display the information, and the replaying includes continuing, as asynchronous display, the replay of the replayed portion of the content data independently of the display of associated data, even if the associated data other than associated data corresponding to the replayed portion of the content data is displayed, wherein the selecting includes ending, when a predetermined time elapses after the associated information other than the one corresponding to the replayed portion is selected, selecting the associated information other than the one corresponding to the replayed portion, the controlling includes automatically switching displayed associated information, after the predetermined time has elapsed when subsequent associated information or replayed associated information is displayed, from the associated information to associated information corresponding to the replayed portion of the content data of time after the predetermined time has elapsed, and wherein the content data is audio data.

* * * * *